United States Patent
Lavelle et al.

(10) Patent No.: US 6,795,078 B2
(45) Date of Patent: Sep. 21, 2004

(54) PARALLEL READ WITH SOURCE-CLEAR OPERATION

(75) Inventors: Michael G. Lavelle, Saratoga, CA (US); Ewa M. Kubalska, San Jose, CA (US); Yan Y. Tang, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 262 days.

(21) Appl. No.: 10/066,397

(22) Filed: Jan. 31, 2002

(65) Prior Publication Data

US 2003/0142101 A1 Jul. 31, 2003

(51) Int. Cl.[7] ............................................. G06G 13/18
(52) U.S. Cl. ..................... 345/535; 345/535; 345/537; 345/557
(58) Field of Search ............................... 345/535, 537, 345/557; 711/3, 119, 118, 142–144

(56) References Cited

U.S. PATENT DOCUMENTS

| | | | |
|---|---|---|---|
| 5,544,306 A | | 8/1996 | Deering et al. |
| 5,757,375 A | * | 5/1998 | Kawase ...................... 345/613 |
| 5,959,639 A | * | 9/1999 | Wada ......................... 345/542 |
| 6,437,789 B1 | * | 8/2002 | Tidwell et al. .............. 345/557 |
| 6,591,347 B2 | * | 7/2003 | Tischler et al. ............. 711/134 |

OTHER PUBLICATIONS

"OpenGL Reference Manual," © 1992 pp. 74–75, 89–92, 101–107 and 251–256.

* cited by examiner

Primary Examiner—Matthew C. Bella
Assistant Examiner—Hau Nguyen
(74) Attorney, Agent, or Firm—Meyertons Hood Kivlin Kowert & Goetzel, P.C.; Jeffrey C. Hood; Mark K. Brightwell

(57) ABSTRACT

A memory interface controls read and write accesses to a memory device. The memory device includes a level-one cache, level-two cache and storage cell array. The memory interface includes a data request processor (DRP), a memory control processor (MCP) and a block cleansing unit (BCU). The MCP controls transfers between the storage cell array, the level-two cache and the level-one cache. In response to a read request with associated read clear indication, the DRP controls a read from a level-one cache block, updates bits in a corresponding dirty tag, and sets a mode indicator of the dirty tag to a the read clear mode. The modified dirty tag bits and mode indicator are signals to the BCU that the level-one cache block requires a source clear operation. The BCU commands the transfer of data from a color fill block in the level-one cache to the level-two cache.

34 Claims, 19 Drawing Sheets

PARALLEL READ WITH SOURCE-CLEAR OPERATION

BACKGROUND OF THE INVENTION

1. Field of the Invention

This invention relates generally to the field of computer graphics and, more particularly, to memory controller architecture.

2. Description of the Related Art

With each new generation of graphics system, there is more image data to process and less time in which to process it. This consistent increase in data and data rates places additional burden on the memory systems that form an integral part of the graphics system. Attempts to further improve graphics system performance are now running up against the limitations of these memory systems in general, and memory device limitations in particular.

In order to provide memory systems with increased data handling rates and capacities, system architects may employ consistently higher levels of integration. One example of increased integration is the 3D-RAM family of memories manufactured by the Mitsubishi Corporation. A 3D-RAM memory may include multiple banks of DRAM main storage with level one and level two cache memories, and a bank-swapped shift register capable of providing an uninterrupted stream of sequential data at current pixel clock speeds.

In graphics applications, it is often necessary or desirable to read data (or a stream of data) from a source buffer, to transfer the data to a destination buffer, and to clear blocks of the source buffer after they have sourced the read operation in anticipation of future operations on the source buffer. Quite often, the source blocks are cleared (e.g. written with a background color) after the read operation has completed. This two-step sequential process of reading followed by source clearing is inefficient. Thus, there exists a need for a system and method capable of performing a read with source clear operation with increased efficiency relative to prior systems and methods.

SUMMARY OF THE INVENTION

In one set of embodiments, an interface device may be configured according to the principles disclosed herein to control accesses to an array of memory devices so that read accesses may be performed in parallel with source-clear operations. Each memory device may include a level-one cache, a level-two cache and a storage cell array (e.g. an array of DRAM cells). The interface device may comprise a memory control processor, a data request processor and a block cleansing unit.

The memory control processor may be configured to control fetch operations from the storage cell arrays to the level-two caches and from the level-two caches to the level-one caches, and also to control write back operations from the level-one caches to the level-two caches. The level-two caches may be configured according to a write-through policy, i.e. data written to a level-two cache may be automatically written through to the corresponding storage cell array. The data request processor may be configured to write data items to a level-one cache in response to a write request, and to control a read access from a level-one cache in response to read requests.

The block cleansing unit couples to an array of status tags which are associated with blocks in the level-one caches. Each status tag include a mode indicator and a dirty tag associated with a level-one cache block. The dirty tags may have a dual interpretation. In a normal writeback mode, bits of a dirty tag indicate which data items in the corresponding level-one cache block have been written to. In a read clear mode, bits of a dirty tag indicate which data items in the corresponding level-one cache block have been read from (and thus require a source clear operation). The mode indicator determines the mode of interpretation for the corresponding dirty tag.

The block cleansing unit may examine the dirty tags of the status array and their corresponding mode indicators to detect level-one cache blocks that have been written to or read from. If the dirty tag of a level-one cache block indicates that it has been written to (i.e. one or more dirty tag bits are set) and the mode indicator is set to the normal writeback mode, the block cleansing unit may command the transfer of one or more data values from the level-one cache block to a corresponding one of the level-two caches. If the dirty tag of a level-one cache block indicates that it has been read from (i.e. one or more of the dirty tag bits are set) and the mode indicator is set to read-clear mode, the block cleansing unit may command a color fill transfer operation from the level-one cache that contains the level-one cache block to a corresponding level-two cache. In the color fill writeback operation, one or more data values in a color fill block of the level-one cache are transferred to the level-two cache. The color fill block may be programmed at some time prior to its use (e.g. at system initialization time, at the beginning of a frame or seqeunce of frames) to contain any desired background color or background pattern. The one or more data values transferred from level-one to level-two (in either normal writeback mode or read clear mode) may be determined by the dirty tag bits which are set.

In response to a read clear request (i.e. a read request that includes a read clear indication), the data request processor may control the transfer of data from a level-one cache block to an output buffer, and set one or more bits of the corresponding dirty tag to a first state and set the mode indicator associated with the first dirty tag to a read clear state. The data transferred to the output buffer may be used to generate a displayable image. For example, such data may comprise samples which may be filtered to determine pixels in a video frame.

In response to a write request, the data request processor may control write one or data items to a block of the level-one cache, and set the one or more bits of the corresponding dirty tag to the first state and set the associated mode indicator to the normal writeback state.

Each memory device may include a separate read bus and write bus between the level one cache and level two caches. This allows write back operations from level one to level two to occur simultaneously with block fetches from level two to level one. In particular, the source-clear operations (i.e. the color fill transfers) invoked by the block cleansing unit may be performed in parallel (i.e. simultaneously) with block fetch operations performed by the memory control processor.

The interface device may be incorporated as part of a graphics system which generates a stream of video pixels in response to received graphics data. The array of memory devices may form a frame buffer for the storage of the video pixels prior to output to a display device. The memory device array may also serve for the temporary storage of samples which are then filter to generate the video pixels.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
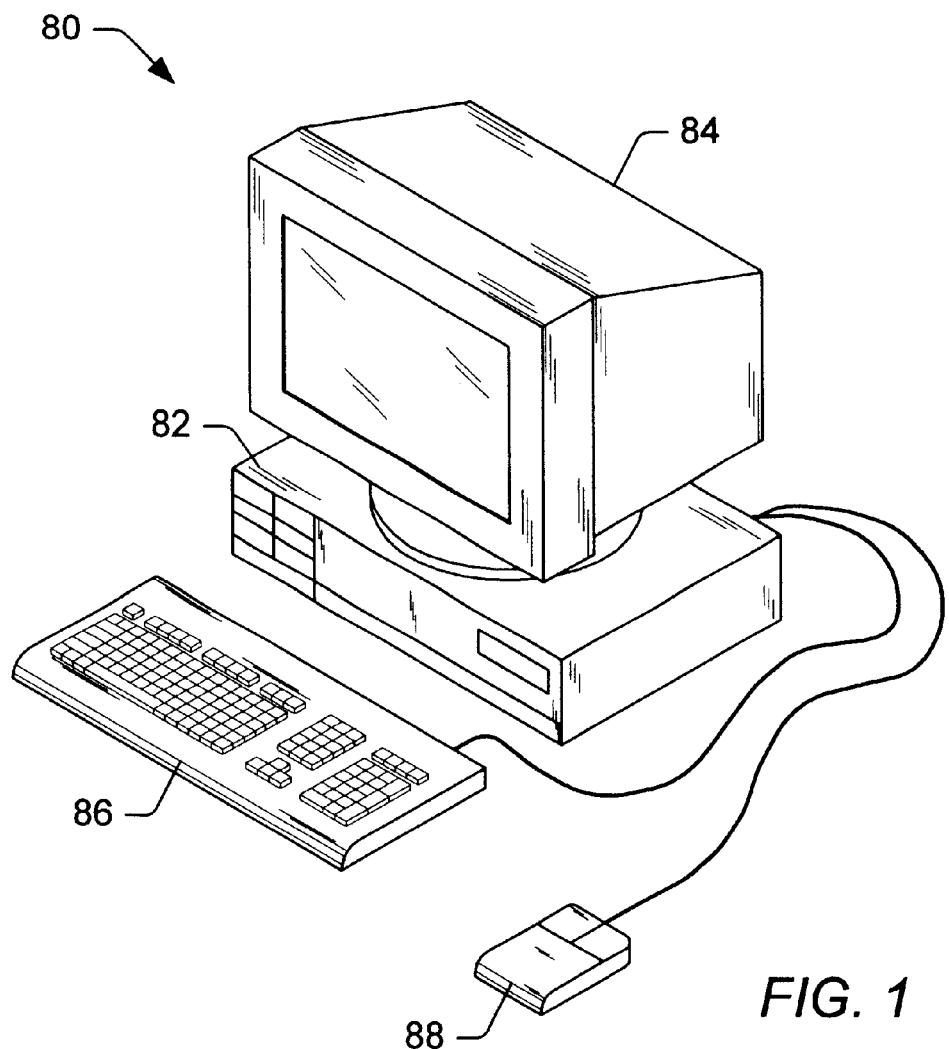
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF SEVERAL EMBODIMENTS

Computer System—FIG. 1

Referring now to FIG. 1, one embodiment of a computer system 80 that includes a graphics system is shown. The graphics system may be comprised in any of various systems, including computer systems, network PCs, Internet appliances, televisions (including HDTV systems and interactive television systems), personal digital assistants (PDAs), virtual reality systems, and other devices which display 2D and/or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
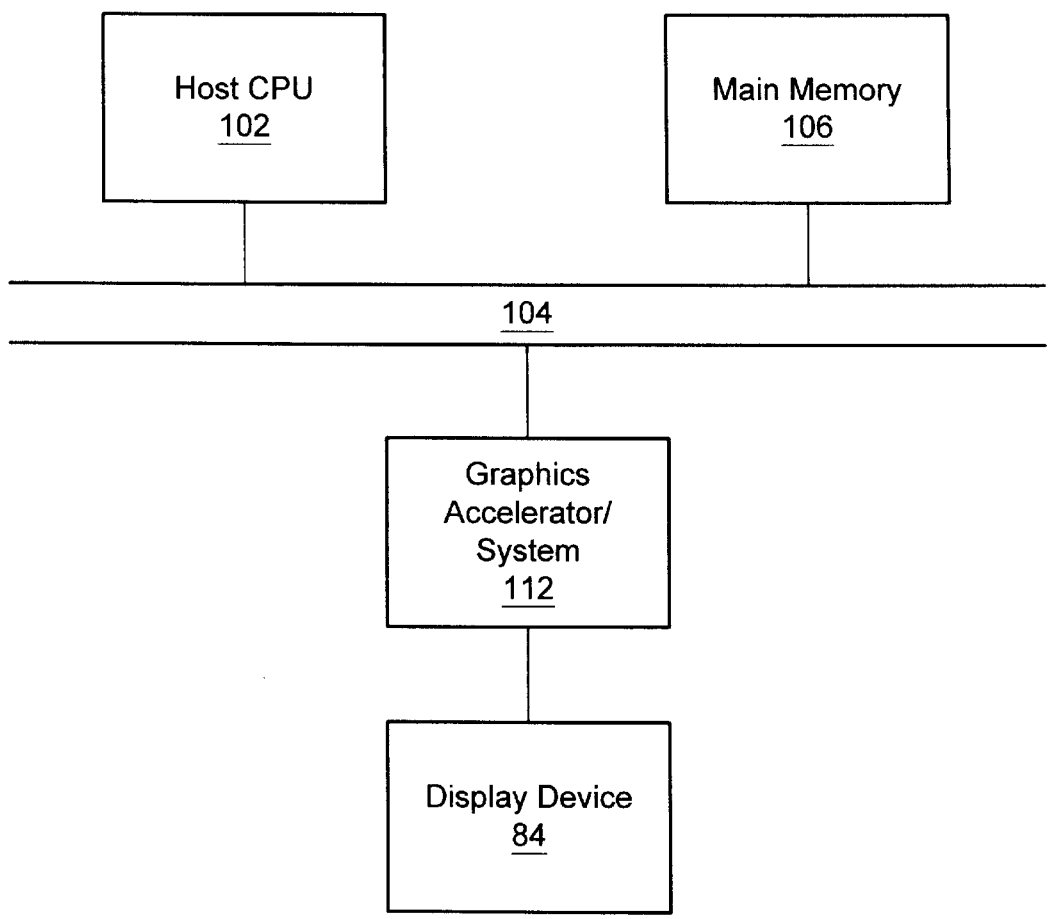
FIG. 2 is a simplified block diagram of one embodiment of a computer system.

Computer System Block Diagram—FIG. 2

Referring now to FIG. 2, a simplified block diagram illustrating the computer system of FIG. 1 is shown. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may comprise one or more processors of varying types, e.g., microprocessors, multi-processors and CPUs. The system memory 106 may comprise any combination of different types of memory subsystems, including random access memories (e.g., static random access memories or "SRAMs," synchronous dynamic random access memories or "SDRAMs," and Rambus dynamic random access memories or "RDRAM," among others) and mass storage devices. The system bus or host bus 104 may comprise one or more communication or host computer buses (for communication between host processors, CPUs, and memory subsystems) as well as specialized subsystem buses.

In FIG. 2, a graphics system 112 is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. As defined by the particular graphics interface used, these primitives may have separate color properties for the front and back surfaces. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by graphics system 112 may be implemented in software.

Figure 3:
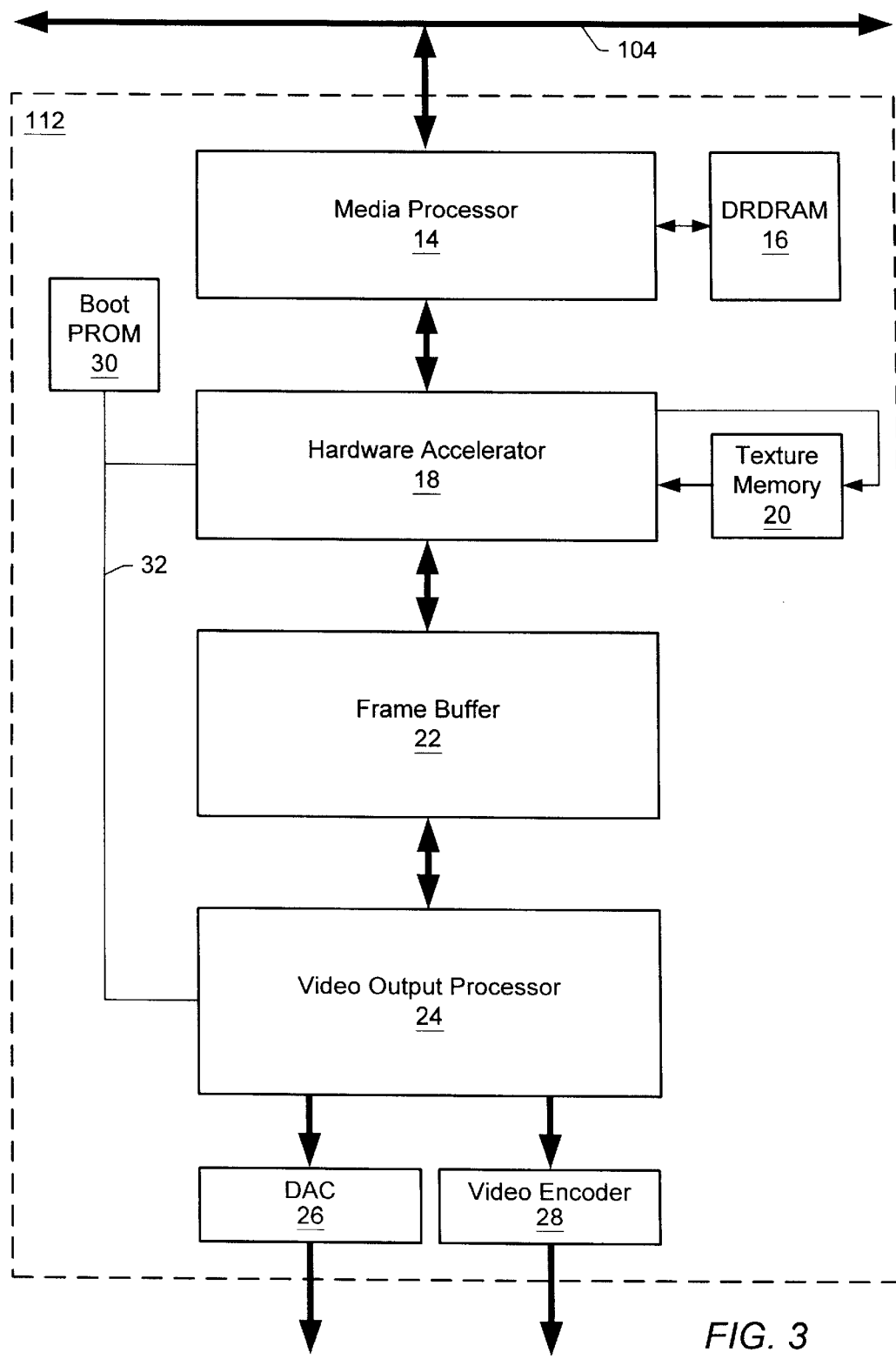
FIG. 3 is a functional block diagram of one embodiment of a graphics system.

Graphics System—FIG. 3

Referring now to FIG. 3, a functional block diagram illustrating one embodiment of graphics system 112 is shown. Note that many other embodiments of graphics system 112 are possible and contemplated. Graphics system 112 may comprise one or more media processors 14, one or more hardware accelerators 18, one or more texture buffers 20, one or more frame buffers 22, and one or more video output processors 24. Graphics system 112 may also comprise one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality implemented in either or both of the media processor or the hardware accelerator may be implemented in software.

In some embodiments, media processor 14 and hardware accelerator 18 may be comprised within the same integrated circuit. In other embodiments, portions of media processor 14 and/or hardware accelerator 18 may be comprised within separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. Host bus 104 may be a bi-directional bus.

Figure 4:
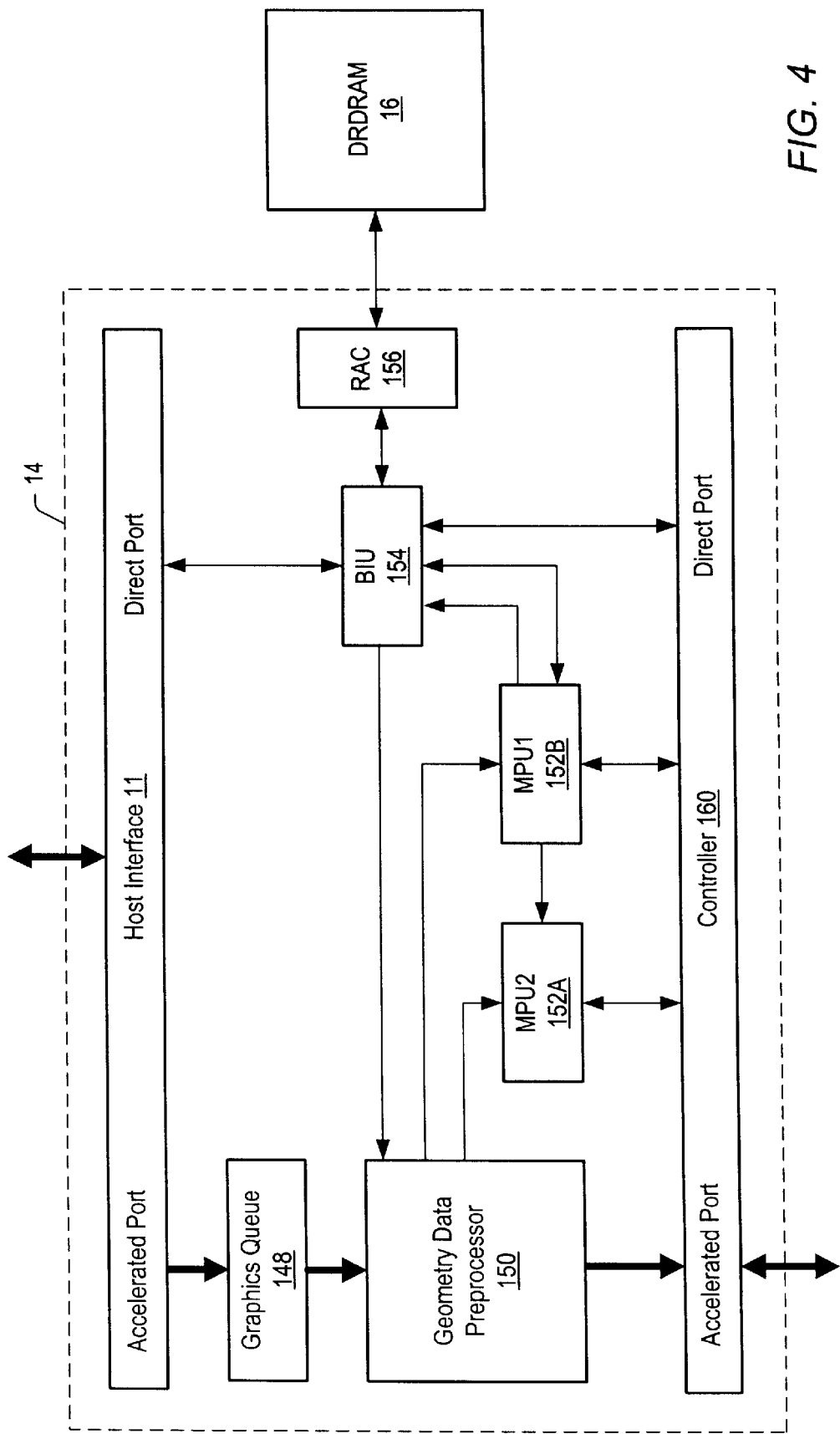
FIG. 4 is a functional block diagram of one embodiment of the media processor of FIG. 3.

Media Processor—FIG. 4

FIG. 4 shows one embodiment of media processor 14. Media processor 14 may operate as the interface between graphics system 112 and computer system 80 by controlling the transfer of data between computer system 80 and graphics system 112. In some embodiments, media processor 14 may also be configured to perform transform, lighting, and/or other general-purpose processing on graphical data.

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different locations.

As illustrated, media processor 14 may be configured to receive graphical data via host interface 11. A graphics queue 148 may be included in media processor 14 to buffer a stream of data received via the accelerated port of host interface 11. The received graphics data may comprise one or more graphics primitives. As used herein, the term graphics primitive may include polygons, parametric surfaces, splines, NURBS (non-uniform rational B-splines), sub-divisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transform and lighting calculations and programmable functions, and to send results to hardware accelerator 18. MPUs 152 may also have read/write access to texels (i.e. the smallest addressable unit of a texture map, which is used to "wallpaper" a three-dimensional object) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to a memory. For example, media processor 14 may include direct Rambus interface 156 to a direct Rambus DRAM (DRDRAM) 16. A memory such as DRDRAM 16 may be used for program and data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface, such as bus interface unit (BIU) 154, which provides a direct port path to memory 16 and to hardware accelerator 18 and video output processor 24 via controller 160.

Figure 5:
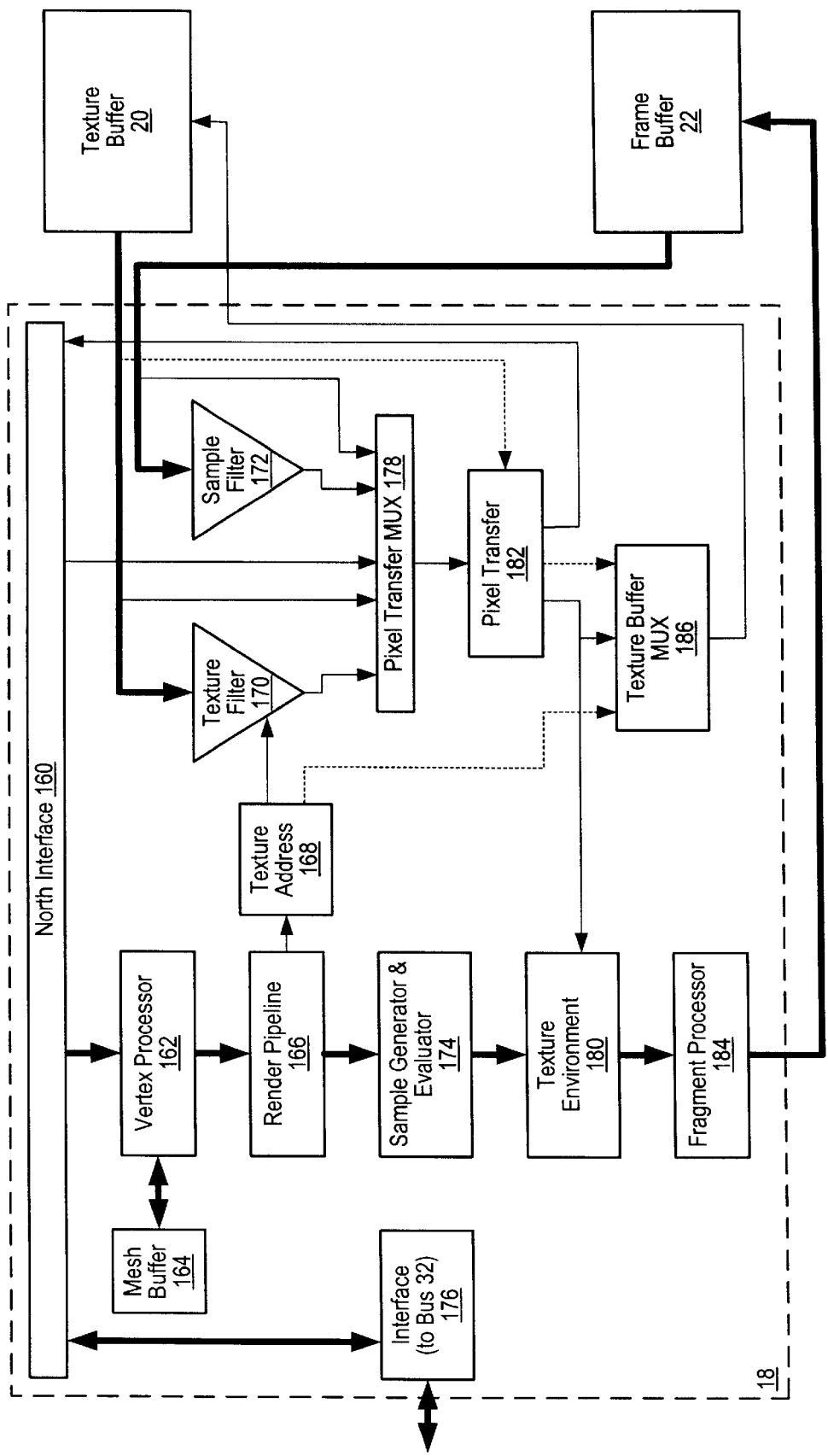
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and then to perform a number of functions on the received data according to the received instructions. For example, hardware accelerator 18 may be configured to perform rasterization, 2D or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window and a viewpoint located in world space. The solid truncated pyramid may be imagined as the union of all rays emanating from the viewpoint and passing through the view window. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculation performed to generate the data used to form each pixel that will be displayed. For example, hardware accelerator 18 may calculate "samples." Samples are points have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 160 (referred to as the "North Interface") to communicate with media processor 14. Hardware accelerator 18 may also be configured to receive commands from media processor 14 through this interface. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to receive vertices corresponding to triangles and identify fragment (i.e. bins) which intersect the triangles. The render pipeline 166 may be configured to rasterize 2D window system primitives (e.g., dots, fonts, Bresenham lines, polygons, rectangles, fast fills, and BLITs (Bit Block Transfers, which move a rectangular block of bits from main memory into display memory, which may speed the display of moving objects on screen)) and 3D primitives (e.g., smooth and large dots, smooth and wide DDA (Digital Differential Analyzer) lines, triangles, polygons, and fast clear) into pixel fragments. The render pipeline 166 may be configured to handle full-screen size primitives, to calculate plane and edge slopes, and to interpolate data down to pixel tile resolution using interpolants or components such as r, g, b (i.e., red, green, and blue vertex color); r2, g2, b2 (i.e., red, green, and blue specular color from lit textures); a (alpha); and z, s, t, r, and w (texture components).

In embodiments using supersampling, the sample generator 174 may be configured to generate samples from the fragments output by the render pipeline 166 and to determine which samples are inside the rasterization edge. Sample positions may be defined in loadable tables to enable stochastic sampling patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and write texels to the texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 160, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of and operations performed on the processed data, the pixel transfer unit 182 may then output the data to the texture buffer 20 (via the texture buffer MUX 186), the frame buffer 22 (via the texture environment unit 180 and the fragment processor 184), or to the host (via north interface 160). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. The storage capacity of texture buffer 20 may take any of a variety of values (e.g., depending on the type of SDRAM included in texture buffer 20). In some embodiments, each pair of SDRAMs may be independently row and column addressable.

Sample-to-Pixel Processing Flow

Hardware accelerator 18 receives geometric parameters defining primitives such as triangles from media processor 14, and renders the primitives in terms of samples. The samples are stored in a sample area of frame buffer 22. The samples are then read from the sample area of frame buffer 22 and filtered by sample filter 22 to generate pixels. The pixels are stored in a pixel area of frame buffer 22. The pixel area may be double buffered. Video output processor 24 reads the pixels from the pixel area of frame buffer 22 and generates a video signal from the pixels. The video signal is made available to one or more display devices (e.g. monitors and/or projectors).

Figure 6:
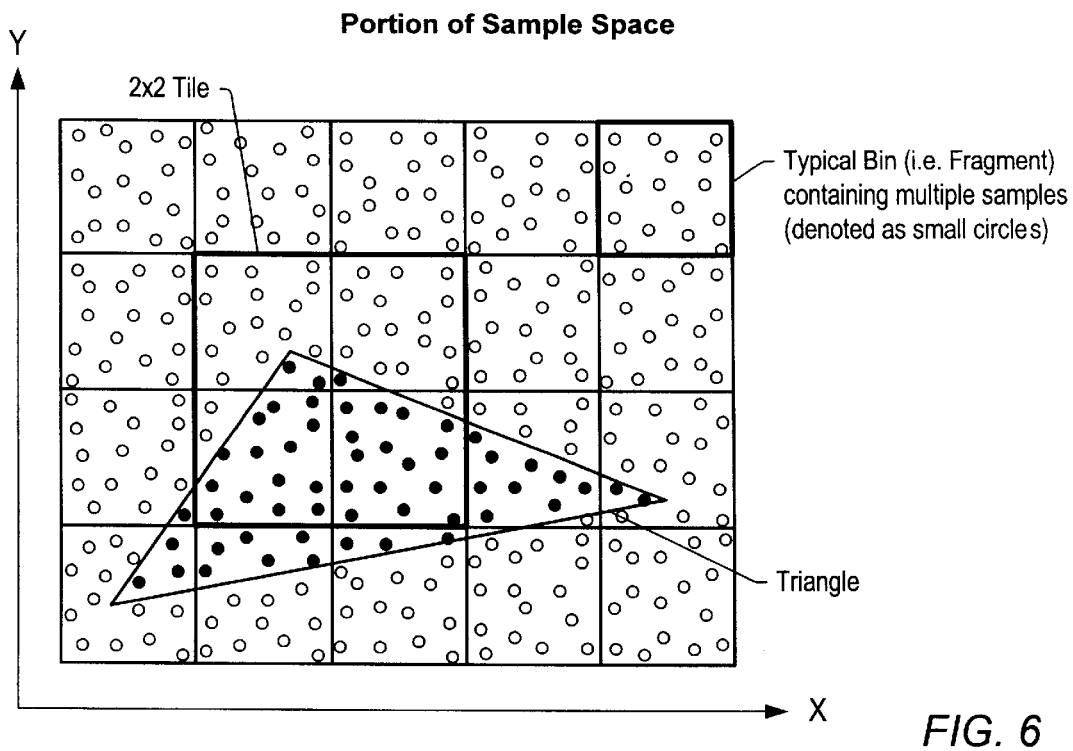
FIG. 6 illustrates a portion of a 2-D rendering space tessellated by an array of bins (i.e. fragments) according to one set of embodiments, where each bin is populated by a set of sample positions.

The samples are computed at positions in a two-dimensional sample space (also referred to as rendering space). The sample space is partitioned into an array of bins (also referred to herein as fragments). The storage of samples in the sample area of frame buffer 22 may be organized according to bins (e.g. bin 300) as illustrated in FIG. 6. Each bin contains one or more samples. The number of samples per bin may be a programmable parameter.

Video Output Processor

Figure 7:
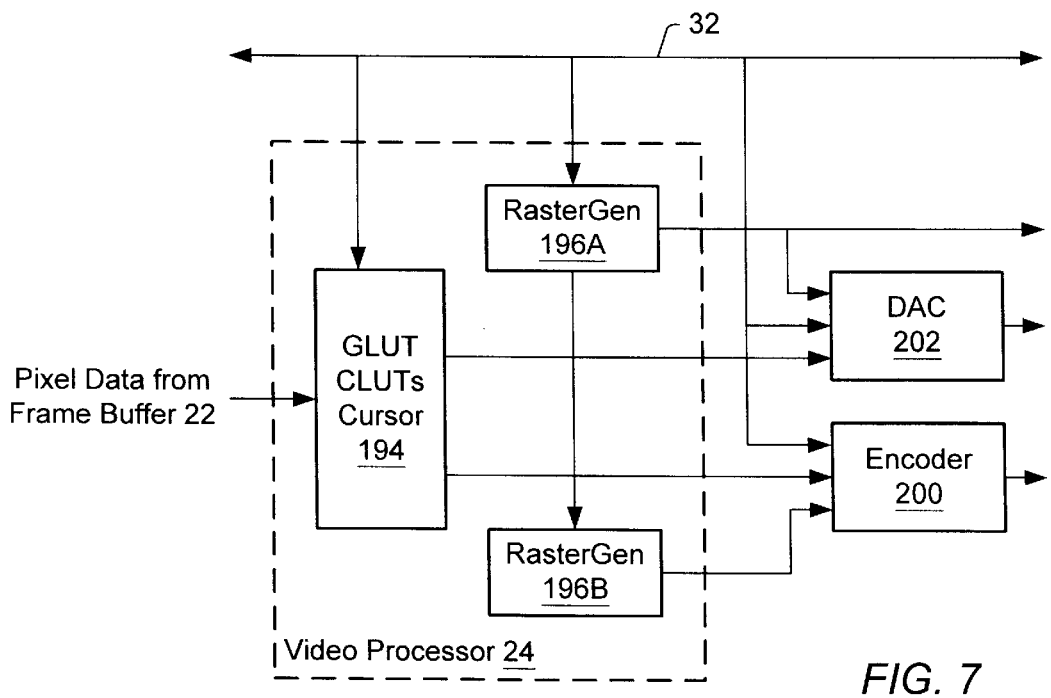
FIG. 7 is a functional block diagram of one embodiment of the video output processor of FIG. 3.

Video output processor 24 may receive a stream of pixels from the pixel area of frame buffer 22. Video output processor 24 may operate on the pixel stream by performing operations such as plane group extraction, gamma correction, pseudocolor or color lookup or bypass, and/or cursor generation. For example, video output processor 24 may include gamma and color map lookup tables (GLUTs, CLUTs) 194 as suggested by FIG. 7.

Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 202 may operate as the final output stage of graphics system 112. The DAC 202 translates the digital pixel data received from GLUT/CLUTs/Cursor unit 194 into analog video signals that are then sent to a display device. In one embodiment, DAC 202 may be bypassed or omitted completely in order to output digital pixel data in lieu of analog video signals. This may be useful when a display device is based on a digital technology (e.g., an LCD-type display or a digital micro-mirror display).

DAC 202 may be a red-green-blue digital-to-analog converter configured to provide an analog video output to a display device such as a cathode ray tube (CRT) monitor. In one embodiment, RGB DAC 202 may be configured to provide a high resolution RGB analog video output at dot rates of 240 MHz. Similarly, encoder 200 may be configured to supply an encoded video signal to a display. For example, encoder 200 may provide encoded NTSC or PAL video to an S-Video or composite video television monitor or recording device.

In other embodiments, the video output processor 24 may output pixel data to other combinations of displays. For example, by outputting pixel data to two DACs 202 (instead of one DAC 202 and one encoder 200), video output processor 24 may drive two CRTs. Alternately, by using two encoders 200, video output processor 24 may supply appropriate video input to two television monitors. Generally, many different combinations of display devices may be supported by supplying the proper output device and/or converter for that display device.

Frame Buffer 22

Figure 8:
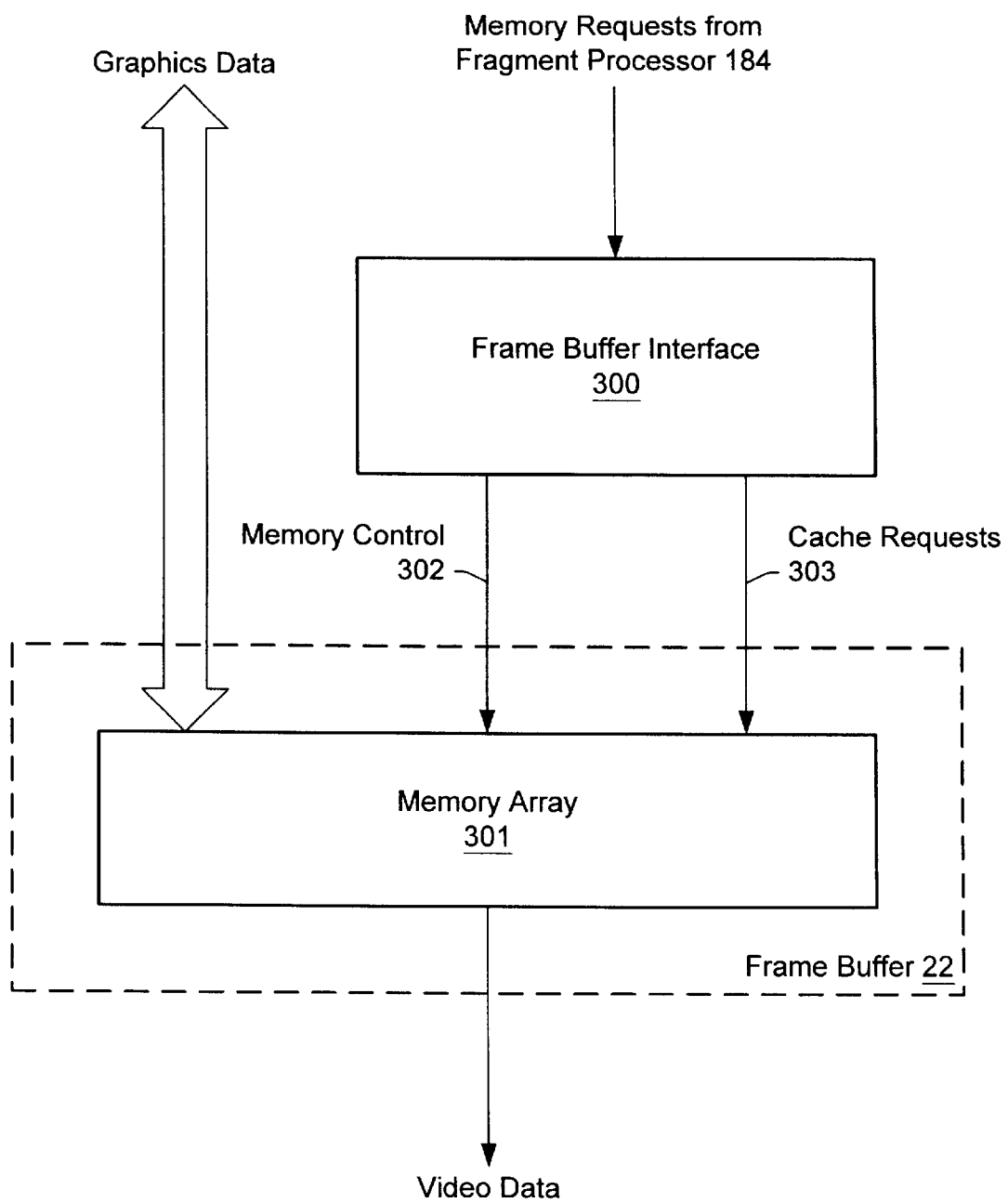
FIG. 8 illustrates the one embodiment of the interaction between frame buffer 22 and a frame buffer interface which controls accesses to the frame buffer 22.

In one set of embodiments, frame buffer 22 may include a memory array 301 and may be controlled by a frame buffer interface 300 as illustrated in FIG. 8. Frame buffer interface 300 may be configured to receive memory requests from fragment processor 184. These requests may be for the storage, retrieval, or manipulation of graphics data in memory array 301.

Fragment processor 184 may assert storage requests to store sample data or pixel data in the memory array 301, and retrieval requests to retrieve sample data or pixel data from the memory array 301. For example, fragment processor 184 may assert retrieval requests for sample data so the sample data may be filtered in sample filter 172, and may assert storage requests to store pixels resulting from the filtration of the sample data. Furthermore, fragment processor 184 may assert retrieval requests to retrieve pixels from the memory array 301 as part of a copy operation which targets a destination buffer in texture memory 20.

In response to a memory request, frame buffer interface 300 may determine what portion of memory array 301 contains the address referenced by the memory request, test for cache hits, and schedule one or more requests to the memory array 301, in addition to other functions as explained in greater detail below.

Memory array 301 may be configured to receive controls from the frame buffer interface 300. In response to these controls, memory array 301 may perform data storage and retrieval, fetches, cache write-backs, and other operations. Graphics data (e.g. pixel data and/or sample data) may be transferred bi-directionally between the memory array 301 and the fragment processor 184. Pixel data may be transferred as individual pixels or as a group of pixels. Sample data may be transferred as a small group of samples corresponding to a single bin, or as a larger group of samples corresponding to a collection of bins (e.g. a 2 by 2 tile of bins). The memory array 301 may also be further configured to output a continuous stream of pixels to the video processor 24.

Figure 9:
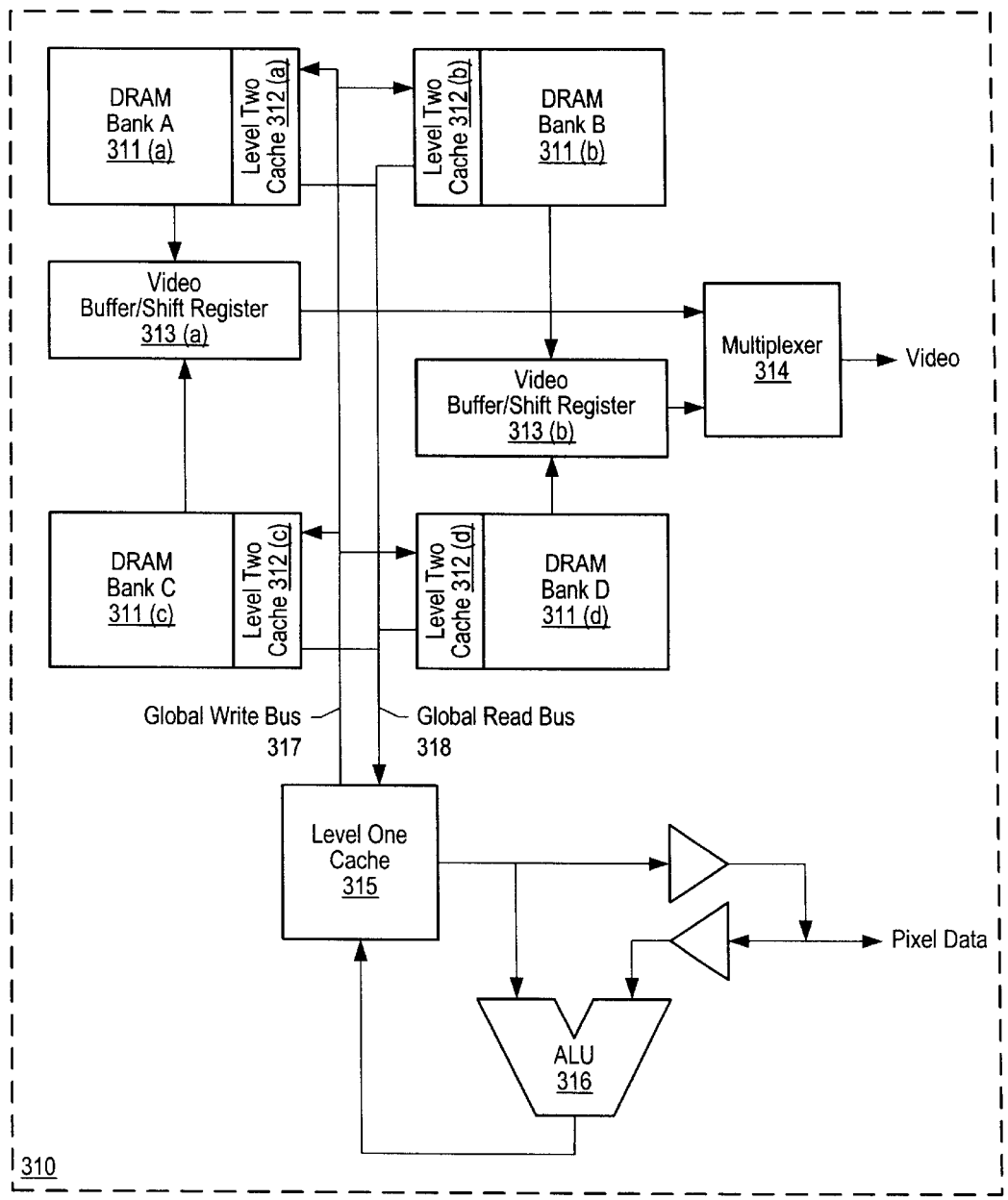
FIG. 9 is a functional block diagram of one embodiment of a 3D-RAM memory device.

In one embodiment, the memory array 301 may include one or more memory devices such as 3D-RAM or 3D-RAM64 memory devices. Turning now to FIG. 9 one possible configuration for a 3D-RAM memory device 310 is illustrated. The total storage capacity of the memory device 310 may be divided among multiple (e.g. four) DRAM banks 311(*a*)–(*d*). Each bank may be further subdivided into a number of pages. A page represents the smallest unit of data in a DRAM bank which may be accessed directly. All four DRAM banks may respond to a common page address to form a page group.

To facilitate the access of pixel data (or sample data) within a page, each DRAM bank may be furnished with a corresponding level two cache. In FIG. 9, the four level two caches are designated with the labels 312(*a*)–(*d*). Each level two cache 312 may be sized appropriately to hold one entire page of data and may in some cases be referred to as a "page buffer". Hence, whenever data is accessed from the DRAM, an entire page is transferred between the DRAM and the corresponding level two cache. In some embodiments, the level two caches may be configured according to a write-through policy (i.e., data written into the level two cache is automatically written through to the DRAM).

The level one cache 315 and the level two caches 312(*a*)–(*d*) may be coupled by a global write bus 317 and a global read bus 318. Thus, data may flow in both directions simulatenously. The global write bus 317 carries write traffic from the level one cache 315 to the level two caches 312(a)–(d). The global read bus 318 carries read traffic from the level two caches 312(a)–(d) to the level one cache 315.

Each page of storage may be further subdivided into blocks. In one set of embodiments, the global write bus 317 and the global read bus 318 are each sized appropriately to allow for the parallel transfer of an entire block of data (e.g. pixels or samples). The two busses imply that graphics data may be transferred in both directions simultaneously.

The level one cache may comprise SRAM memory with sufficient capacity to store multiple blocks. However, during cache write-back operations (from level one to level two), it is inefficient from a power standpoint to transfer an entire block of graphics data when a small percentage of pixels (or samples) within that block contain modified values. Consequently, a write partial block command may be implemented in the frame buffer interface 300. The write partial block command employs an operand or tag which contains bits indicative of the pixels (or samples) within a block which contain modified values. Upon issuance of this command, only these modified values are written back from the level one cache to the level two cache.

The frame buffer interface 300 may store and manage two or more tag lists. The first tag list may contain one tag for every active block in each of the level one caches 315. The second tag list may correspond to pages in the level two caches. Each block in the level one cache 315 may contain spatially contiguous pixel or sample data. However, the blocks themselves may not be contiguous spatially. Additionally, each block of data in the level one cache 315 may correspond to data stored in one and only one of the DRAM banks 311(a)–(d).

In one embodiment, the level one cache 315 may be a multi-ported memory. The level one cache 315 may have an input port coupled to the global read bus 318 dedicated for transfers from level-two caches 312(a)–(d) to the level one cache 315. The level one cache 315 may have an output port coupled to the global write bus 317 dedicated for transfers from the level one cache 315 to level two caches 312(a)–(d).

A third port may be a dedicated input and receive the output of the ALU 316 which is described below. Another port may be a dedicated output which may be utilized to furnish the ALU 316 with an operand and/or to communicate pixel and/or sample data to circuitry outside the 3D-RAM 310.

The ALU 316 may receive as one operand inbound pixel or sample data communicated from circuitry outside of the 3D-RAM 310. The second operand may be fetched from a storage location within the level one cache 315. The ALU may be configured to implement a number of mathematical functions on the operands in order to effect the combination or blending of new pixel/sample data with data existing in the 3D-RAM 310. For example, a weighted sum of the new pixel/sample data and the existing pixel/sample data may be formed. Coefficients of the weighted sum may be determined by a transparency value supplied with the new pixel/sample data. The existing pixel/sample data may be replaced with the weighted sum.

The 3D-RAM 310 may also be equipped with two video buffer/shift registers 313. These shift registers are configured as parallel-in-serial-out devices, which may be broadside loaded with full or partial display lines of pixel data. The shift registers 313 may then output the data sequentially in response to an external pixel clock. In order to provide for a continuous stream of pixels at the video output, the two shift registers may alternate duty (i.e., one loading data while the other is outputting data). The outputs of the two shift registers may then be combined into a single stream of video data by a multiplexer 314.

Figure 10:
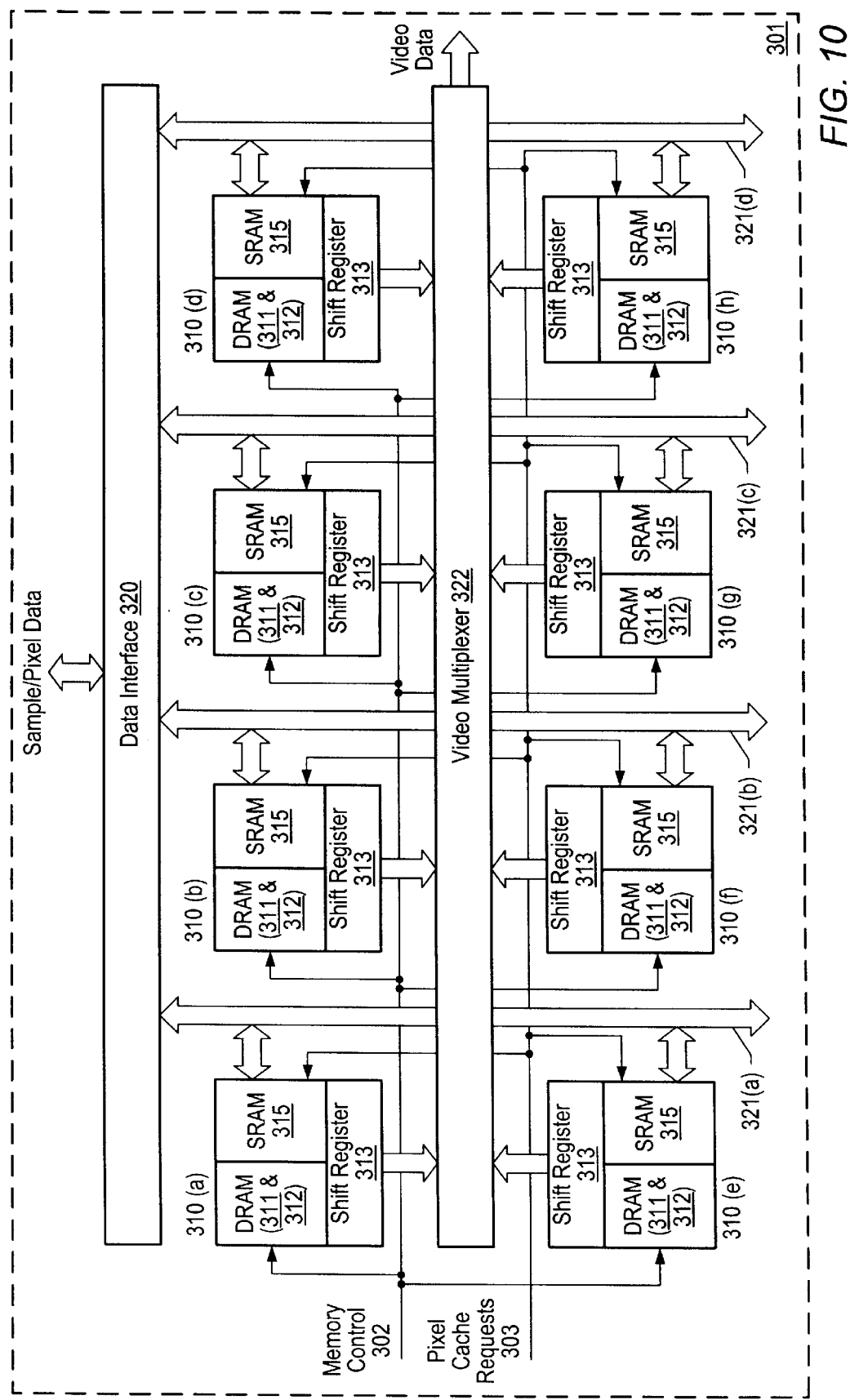
FIG. 10 is a functional block diagram of one embodiment of the memory array of FIG. 8.

As shown in FIG. 10, memory array 301 may comprise an array of 3D-RAM devices 310. In one set of embodiments, memory array 301 may be segmented to facilitate the storage and retrieval of multiple data items (or blocks of data items) in parallel. For example, the 3D-RAM devices 310 may be organized into, e.g., four columns to accommodate the storage or retrieval of four data items (or blocks of data items) in parallel. Data interface 320 communicates with the 3D-RAM devices of each column through a corresponding bi-directional data bus 321.

In a sample storage operation, fragment processor 184 may deliver a tile of bins to data interface 320. A tile may be a 2×2 square of bins in sample space. Each bin contains a set of one or more samples. Data interface 320 may send the four bins down the four data buses 321 respectively for storage in the four columns respectively. A pixel storage operation may operate similarly except the data interface 320 receives and sends down groups of four pixels.

In a sample retrieval operation, data interface 320 may receive a tile of bins from the four columns (one bin per column) through the four respective data busses, and deliver the tile of bins to some destination such as sample filter 172. Sample filter 172 may perform a spatial filtering operation on the samples to generate pixel color values. It is noted that sample filter 172 may be configured to use samples from one or more tiles to generate each pixel. Sample filter 172 may send the pixels down to the frame buffer 22 through pixel transfer MUX 178, pixel transfer unit 182, texture environment 180 and fragment processor 184.

In a pixel retrieval operation, data interface 320 may receive a group of four pixels from the four columns and send the group of pixels to a destination buffer (e.g. an area in texture buffer 20). For example, an array of pixels generated in one frame may be transferred to texture buffer 20 for use as a texture map in successive frames.

In response to receiving inbound data (e.g. pixel data or sample data), data interface 320 may route the data to a level one cache 315 in one of the 3D-RAM devices 310. Data interface 320 may receive cache requests 303 from a data request processor 336 (described in detail below) in frame buffer interface 300. The cache requests 303 may include a target address for the data to be stored in the 3D-RAM device 310. Along with the target address, opcodes for ALU 316 may be sent allowing for the arithmetic combination of the incoming data with corresponding data already stored in the 3D-RAM device 310.

Frame buffer interface 300 may receive a retrieval request from fragment processor 184, i.e. a request for the retrieval of a block of pixel data or sample data from the memory array 301. A retrieval request may comprise the source address of the data block to be retrieved. If the requested data block is currently residing in one of the level one cache memories 315, the data request processor 336 may issue a cache request to that level one cache memory. A cache request may include the block address of the requested data block in that level one cache memory. The level one cache memory may respond by placing the requested data block on the corresponding data bus 321 where it is delivered to the data interface 320. The data interface 320 may deliver the requested data block to frame buffer read buffer FRB or fragment processor 184.

When data that is requested from the memory array 301 is not currently residing in the level one cache 315 (i.e., a level one cache miss), a cache operation may be requested prior to the issuance of any cache requests 303. If the data is determined to be located in the level two cache 312 (i.e., a level two cache hit), then the memory control processor 335 (described in detail below) may invoke a block transfer by asserting the appropriate memory control signals 302. In this case, a block of memory within the level one cache 315 may be allocated, and a block of data may be transferred from the level two cache 312 to the level one cache 315. After this transfer is completed, the cache requests 303 described above may be issued.

If the requested data is not found in the level two cache (i.e., a level two cache miss), the memory control processor 335 may command a page fetch by asserting the appropriate memory control signals 302. In this case, an entire page of pixel data is read from the appropriate DRAM bank 311 and deposited in the associated level two cache 312. Once the page fetch is completed, then the block transfer and cache requests 303 described above may be issued.

The 3D-RAM devices 310 may also receive requests for video which cause data to be internally transferred from the appropriate DRAM banks 311 to the shift registers 313. In the embodiment shown, the video streams from all 3D-RAM devices 310 in the array are combined into a single video stream through the use of a multiplexer 322. The output of the multiplexer 322 may then be delivered to the video output processor 24. In other embodiments of the memory array 301, the video streams from each 3D-RAM may be connected in parallel to form a video bus. In this case, the shift registers 313 may be furnished with output enable controls, where the assertion of an output enable may cause the associated shift register 313 to place data on the video bus.

Figure 11:
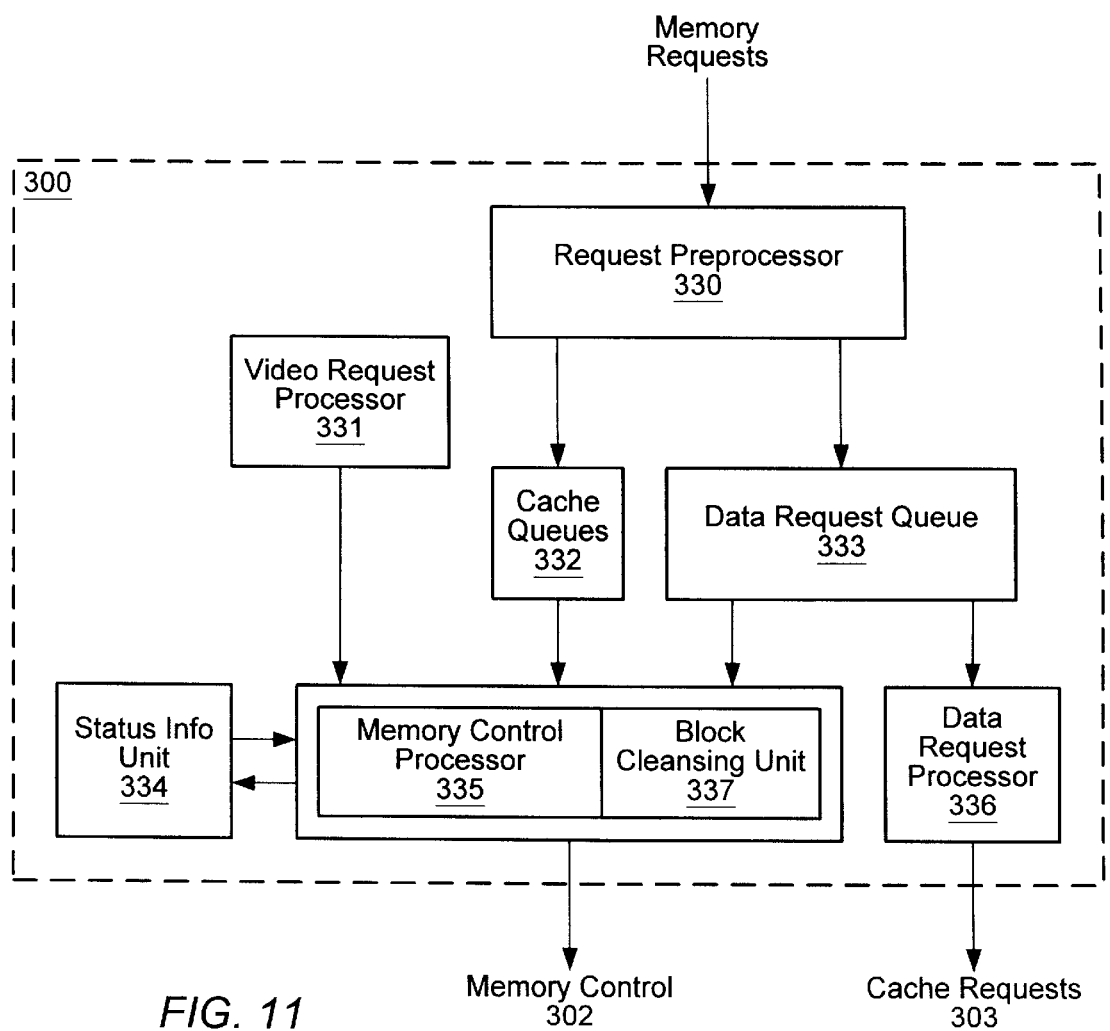
FIG. 11 is a functional block diagram of one embodiment of the frame buffer interface of FIG. 8.

Turning now to FIG. 11, one embodiment of the frame buffer interface 300 is shown. The request preprocessor 330 may be configured to receive memory requests relative to memory array 301. These memory requests may represent requests for data storage/retrieval, manipulation, fill, or other operations. A request address submitted with the memory request may be examined to determine a page and block address in the memory array 301. The request address may be a source address from which data is to be retrieved or a target address to which data is to be written.

Within the request preprocessor 330, tag lists may be maintained for both the level one and the level two caches. These tag lists may represent the current state of the caches, as well as any pending cache requests already in the cache queues 332. The tag lists are examined against the page and block addresses for a hit indicating that a requested block is currently residing in the level one cache. If the examination reveals that the requested block is already in the level one cache, request preprocessor 330 may place a request in the data request queue 333. Otherwise, the miss is evaluated as either a level one or a level two miss, and a request to the appropriate cache or caches is placed in the cache queue 332.

In this example, the cache queues 332 are two small queues which may operate in a FIFO mode and may differ in depth. Where the queue for the level two cache may be 4 entries deep, the queue for the level one cache may be 8 entries, or twice as large. The cache queues 332 receive queue requests from the request preprocessor 330 and buffer them until the memory control processor 335 is able to service them. Requests placed in the level two cache queue may include an indication of a page address to fetch and a bank from which to fetch the page. Requests placed in the level one cache queue may include a level two block address to fetch into the level one cache. The depth values of eight and four specified above for the level one cache queue and level two cache queue respectively are exemplary, and a wide variety of other values are possible and contemplated.

The data request queue 333 is a small FIFO memory, which may be larger than either of the two cache queues 332. In this example, the data request queue 333 may be 16 entries deep and logically divided into an address queue and a data queue. The data request queue 333 receives requests to store, retrieve or modify data (e.g. sample data or pixel data) from the request preprocessor 330, and buffers the requests until the data request processor 336 is able to service them. The depth value of 16 specified above for the data request queue is exemplary, and a wide variety of other values are possible and contempalted.

The memory control processor 335 receives requests from both the cache queues 332 and the data request queue 333 and issues the appropriate memory controls to the memory array 301. The memory control processor 335 maintains a second set of tag lists for the level one and level two caches. Unlike the tag lists which are maintained by the request preprocessor 330, the tag lists within the memory control processor contain only the current state of the two caches. In evaluating the requests from the queues, page and block addresses are checked against the cache tag lists and misses are translated into the appropriate fetch operations.

A block cleansing unit 337 may be configured for cleansing blocks within the level one caches 315. The block cleansing unit 337 along with data request processor 336 may maintain information which describes the current status of each block of data currently residing in the level one cache memories. The status may include a tag indicating whether or not the block is "dirty" (i.e., whether or not the data within the block has been modified by a write operation making it potentially inconsistent with the corresponding block in the level two cache). The status may also include a tag maintained and associated with a block which describes the usage. The most recently accessed block in the cache may have a low or zero value for this tag, whereas a block that has not been recently accessed may have a high value. The block cleansing unit 337 utilizes this status information to periodically write back dirty blocks that have not been accessed recently to the level two cache 332. After the write back of a block from the level one cache to the level two cache, the block cleansing unit 337 may clear the dirty tag for the block indicating that the block is now clean (i.e. consistent with the corresponding level two cache block). In this manner, least recently used blocks are kept clean, and hence available for future allocation. Frequently, a dirty block may contain a small percentage of modified values. In these cases, it may be inefficient from a power standpoint to write back the entire block.

Therefore, frame buffer interface 300 may include a status information unit 334 to manage an array of dirty tags. In one embodiment, the status information unit 334 may comprise a collection of flip-flops with one flip-flop reserved for each data item (e.g. word of storage) in a level one cache 315. The memory array 301 may contain more than one 3D-RAM, and thus, there may be several banks of dirty tags, one bank for each 3DRAM in the memory array 301. In response to a request from the block cleansing unit 337, the memory control processor 335 may implement a partial block write back from the level one cache 315 to the level two cache. The memory control processor 335 may send a level one cache block address and the corresponding dirty tag to the level one cache 315 and the corresponding target DRAM address to the level two cache. The level one cache 315 may selectively write back to the level two cache only those data items within the level one cache block that are marked as dirty. This may reduce the average power required to execute the write back transfers.

The data request processor 336 may be configured to receive requests from the data request queue 333. In response to these requests, the data request processor 336 may issue commands to the memory array 301 for the storage or retrieval of data to/from the level one caches 315. The data request processor 336 may be additionally configured to maintain information related to the most recent instructions issued to the memory array 301, and in this way internally track or predict the progress of data items through the processing pipeline of the 3D-RAM.

The video request processor 331 may be configured to receive and process requests for video pixels from the memory array 301. These requests may contain information describing the page where the desired data is located, and the display scan line desired. These requests may be formatted and stored until the memory control processor 335 is able to service them. The video request processor 331 may also employ a video request expiration counter. This expiration counter may be configured to determine deadlines for requests issued to the memory array 301 in order to produce an uninterrupted stream of video data. In circumstances where a request is not issued within the allotted time, the video request processor may issue an urgent request for video.

Figure 12:
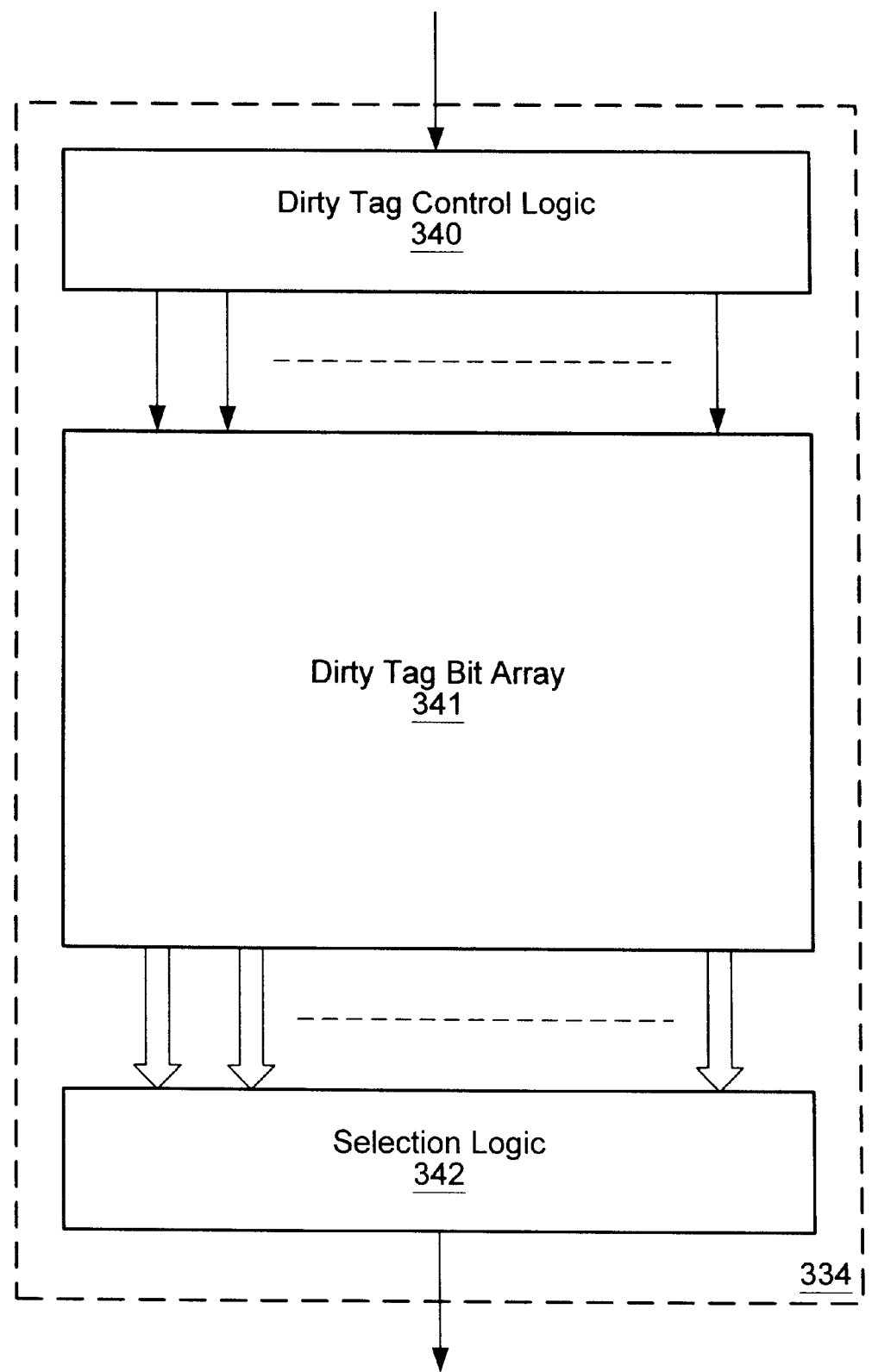
FIG. 12 is a simplified block diagram of one embodiment of the dirty tags of FIG. 11.

Turning now to FIG. 12, one embodiment of the status information unit 334 is illustrated. The dirty tag control logic 340 may be employed to listen to cache requests and cache operations as described above and translate these events into controls which determine the contents of the dirty tag bit array 341. For example, any block transfer occurring between a level two cache 312 and a level one cache 315 may be translated to control signals which cause all dirty tag bits associated with the block to be set to a known state indicating that the data in the block is unmodified. In this case, "unmodified" means that the block of data residing in the level one cache 315 is equivalent to the copy held in the level two cache 312, and hence the same as the corresponding data stored in the associated DRAM bank 311.

The dirty tag control logic 340 may detect a write (i.e. storage) operation to a level one cache block and may responsively generate control signals. The control signals set the dirty tag bits of the one or more data items in the level one cache block which are targeted by the write operation to a modified state. In this case, "modified" means that the indicated data item in the level one cache block may be different from the copy held in the level two cache 312, and hence different from the original data stored in the associated DRAM bank 311.

The selection logic 342 may receive requests from the block cleansing unit 337. In response to each request, the selection logic 342 may select and output the status values stored in the dirty tag bit array 341 flip-flops associated with a current block under examination by the block cleansing unit 337.

Figure 13:
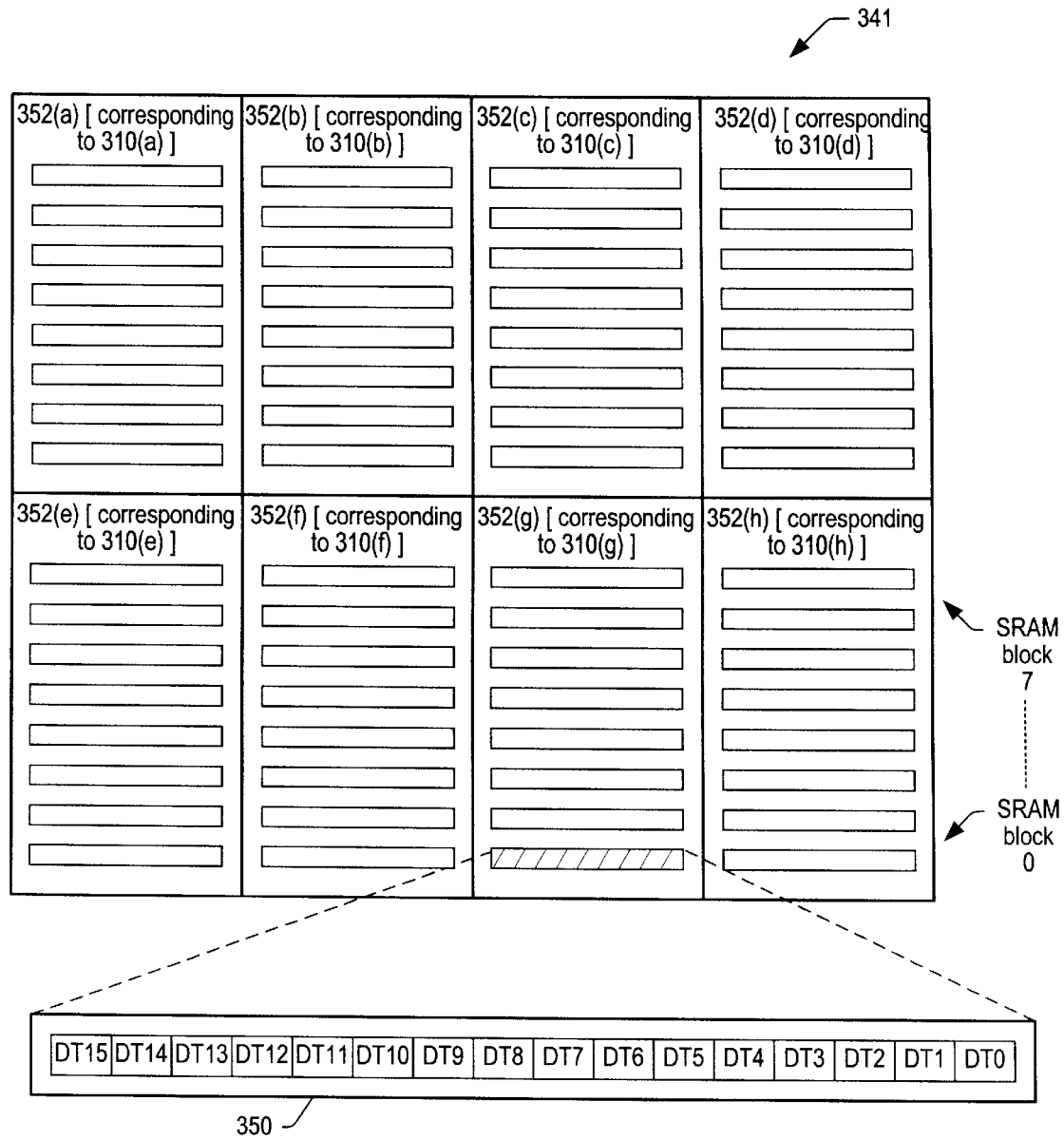
FIG. 13 is a diagrammatic illustration of one embodiment of the dirty tag bit array structure in FIG. 12.

Turning now to FIG. 13, one embodiment of the internal structure of the dirty tag bit array 341 is illustrated. In this example, the memory array 301 is assumed to comprise eight 3D-RAM devices 310, and hence eight level one caches 315. In addition, this example further assumes that each level one cache 315 comprises eight blocks of data, and that each block comprises sixteen data items (e.g. samples or pixels).

In accordance with the preceding assumptions, the dirty tag bit array 341 may be divided into eight sections 352(a–h) with each section corresponding to one 3D-RAM device 310 in the memory array 301. Each of the eight sections 352 (a–h) may be further subdivided into eight status words 350, where each word is associated with a block of memory in one of the level one caches 315. Lastly, each word may comprise sixteen bits with each bit corresponding to one data item (e.g. pixel or sample) within a block of level one cache 315 memory. The individual bits may be physically represented by a single flip-flops or memory cells which holds the status information of the associated data item (e.g., a flip-flop value equal to a logic 1 indicates that the associated data item has been modified, and a flip-flop value equal to logic 0 indicated that the associated data item is unmodified).

Figure 14:
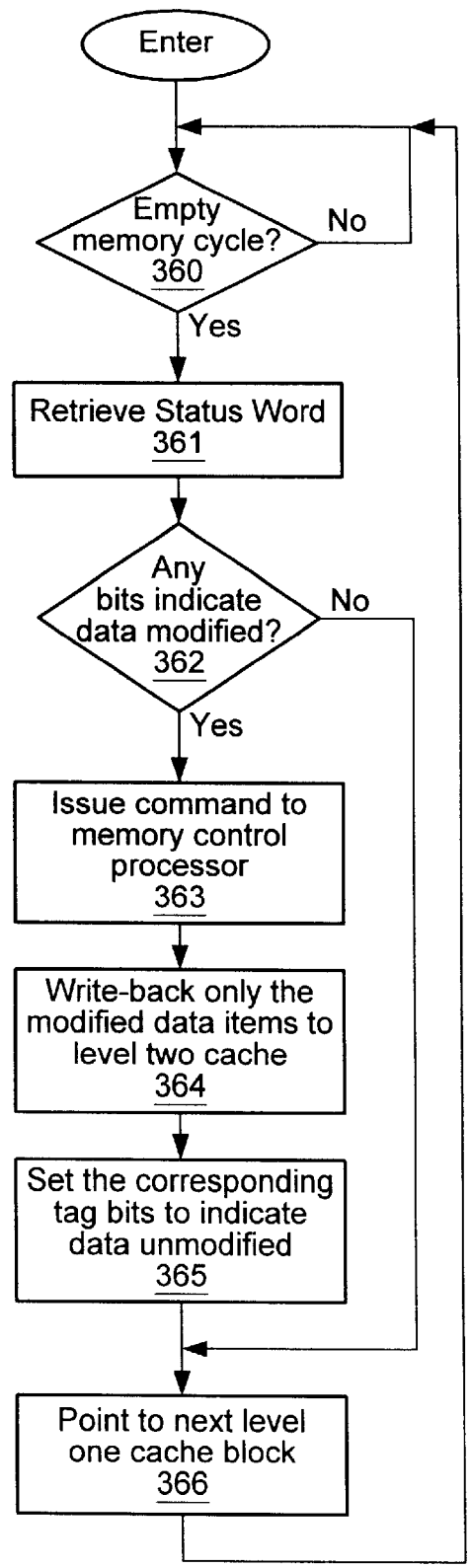
FIG. 14 illustrates one embodiment of a method to manage the two caches within the 3D-RAM device of FIG. 9.

Turning now to FIG. 14 a flow diagram is illustrated which represents one embodiment of a method for cleansing blocks from one or more of the level one caches 315 utilizing the dirty tag bits described above. This block cleansing method may be implemented by block cleansing unit 337 in conjunction with memory control processor 335. The block cleansing unit may operate during empty memory cycles. Hence in step 360 execution of the block cleansing procedure may stall until an empty memory cycle is detected. Once an empty memory cycle is encountered, the block cleansing unit may retrieve the status word 350 corresponding to the current level one cache block in the current level one cache 315 under examination from the dirty tag bit array 341 as indicated in step 361. (The current level one cache block may be the least recently used block in the level one cache 315.) The status word may comprise a dirty tag with sixteen dirty tag bits corresponding to the sixteen data items within the level one cache block.

In step 362, the block cleansing unit 337 may test the dirty tag bits of the status word 350 in order to determine if any of the corresponding data items in the level one cache block have been modified. If the result of the test indicates that none of the data items within the block have been modified, the block cleansing procedure skips to the examination of the next block (e.g. the next least recently used block). If however the dirty tag indicates that some data item within the block has been modified, the block cleansing unit 337 may issue a command to the memory control processor 335 requesting a cache operation (step 363).

The memory control processor 335 responds to the cache operation request by commanding a block write-back or partial block write-back of the level one cache block containing the modified data as indicated in step 364. As described above, memory control processor 335 may supply the dirty tag for the level one cache block as well as the address of the level one cache block to the appropriate level one cache 315. The level one cache 315 may then execute the write partial block command by copying only those data items indicated as being modified back to the level two cache 312. Furthermore, in those embodiments where the level two cache 312 is configured as a write-through cache the modified data items are also automatically stored in the associated DRAM bank 311.

In step 365, the block cleansing unit 337 may set all bits of the dirty tag to the clean state indicating that the level one cache block is unmodified. Step 365 may be performed after the partial block transfer is complete. Alternatively, step 365 may be performed after step 363.

The next block to be examined is then identified (step 366) and execution of the procedure resumes from the beginning. The next block to be examined may be next least recently used block in the level one cache 315.

Hence according to the illustrated embodiment, blocks within the level one cache 315 are kept "clean" (i.e., free of modified data which does not exist also in the level two cache 312 and the DRAM bank 311) through a process of examination and write-back. These clean blocks are consequently available for future allocations.

Data request processor 336 handles (a) write requests to the level one caches 315 and (b) read requests from the level one caches. In response to a write request which updates a block A in a level one cache, the data request processor 336 may set the dirty tag bits of block A indicating which of the data items in block A are written to. In response to a read request in read clear write mode, data request processor 336 reads data from a block B (not necessarily distinct from block A) of a level one cache, and sets the bits of the dirty tag of block B indicating which of the data items in block B are read from.

Figure 15:
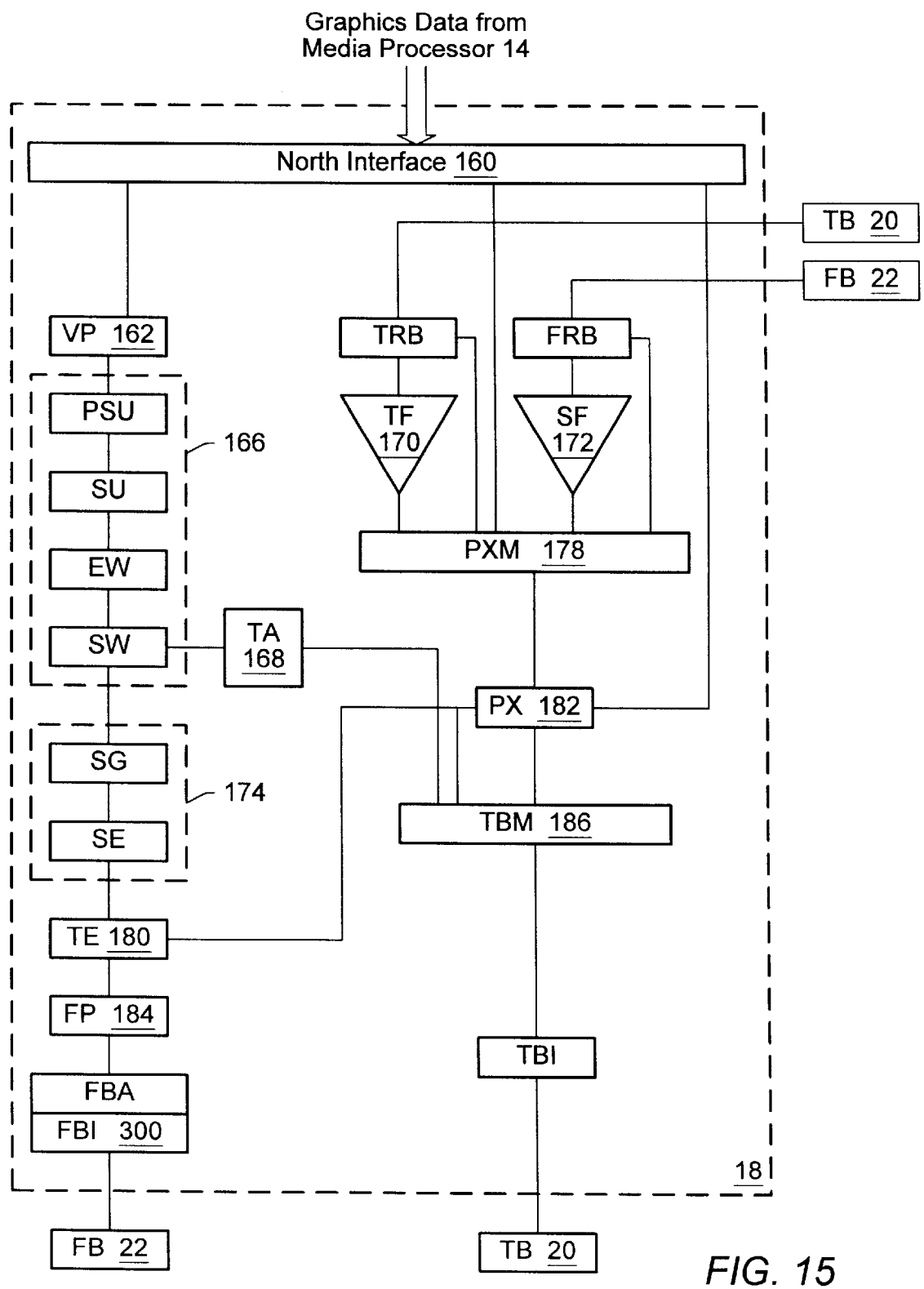
FIG. 15 illustrates one embodiment of hardware accelerator 18 of FIG. 3.

Hardware Accelerator Details—FIG. 15

FIG. 15 presents one embodiment of the hardware accelerator 18 of FIG. 5 in greater detail. Namely, a frame buffer address unit FBA and frame buffer interface FBI 300 intervenes between fragment processor 184 and frame buffer 22, and a texture buffer interface TBI intervenes between texture buffer MUX 186 and texture buffer 20. A texture read buffer TRB intervenes between texture buffer 20 and texture filter 170, and a frame buffer read buffer FRB intervenes between sample filter 172 and frame buffer 20. Furthermore, render pipe 166 comprises a presetup unit PSU, a setup unit SU, an edge walker EW and a span walker SW. Sample generator and evaluator 174 comprises a sample generation unit SG and a sample evaluation unit SE. It is noted that frame buffer 22 is represented in FIG. 15 with two boxes for the sake of diagrammatical simplicity. The two boxes are to be identified as one and the same frame buffer. The same comment holds for texture buffer 20.

The north interface 160 receives graphics data from media processor 14 and forwards the graphics data to vertex processor 162. Vertex processor assembles the graphics data into distinct primitives (e.g. triangles), and passes the primitives to the presetup unit PSU. The presetup unit and setup unit receive primitives and compute parameters that will be needed downstream, e.g., parameters such as the edge slopes, vertical and horizontal rates of change of color, α, Z, etc. A triangle may be rendered by walking a bin or a tile (e.g. a 2×2 square of bins) across successive spans which cover the triangle. A span may traverse the triangle horizontally or vertically depending on the triangle. The edge walker may identify points on opposite edges of the triangle that define the endpoints of each span. The span walker may step across each span generating the addresses of bins or tiles along the span.

Sample generator SG may populate each bin or tile along a span with sample positions. Sample evaluator SE may determine which of the sample positions in each bin reside interior to the current triangle. Furthermore, sample evaluator SE may interpolate color, α and Z for the interior sample positions based on the parameters computed earlier in the pipeline.

Texture environment 180 may apply one or more layers of texture to the interior samples of each bin. Texture layers and/or other image information may be stored in texture buffer 20. Texture filter 170 accesses texels from texture memory based on address information provided by texture address unit 168, and filters the texels to generate texture data which is forwarded to texture environment 180 for application to primitives. The texture address unit 168 may generate the texture memory addresses from texture coordinate information per bin provided by span walker SW.

After any desired texturing, bins or tiles may be sent down to frame buffer 22 for temporary storage. A bin may include a valid bit for each sample to indicate if the sample resides interior to the current primitive (e.g. triangle). Frame buffer 22 may store only the valid (i.e. interior) samples. Also, frame buffer 22 may perform Z buffering using the Z coordinate of each sample.

When a whole frame's worth of primitives have been rendered into samples and stored into frame buffer 22, hardware accelerator 18 may perform sample filtering to generate pixels for the frame. Namely, sample filter 172 reads frame buffer 22 and filters the samples comprising the frame to generate a corresponding frame of pixels. The frame of pixels is stored into a pixel area (also referred to herein as on-screen memory) of frame buffer 22 and then handed off to video output processor 24. The pixel area may be double-buffered to facilitate the concurrent operation of hardware accelerator 18 and video output processor 24.

Frame Buffer to Texture Buffer Copy Operation

Figure 16:
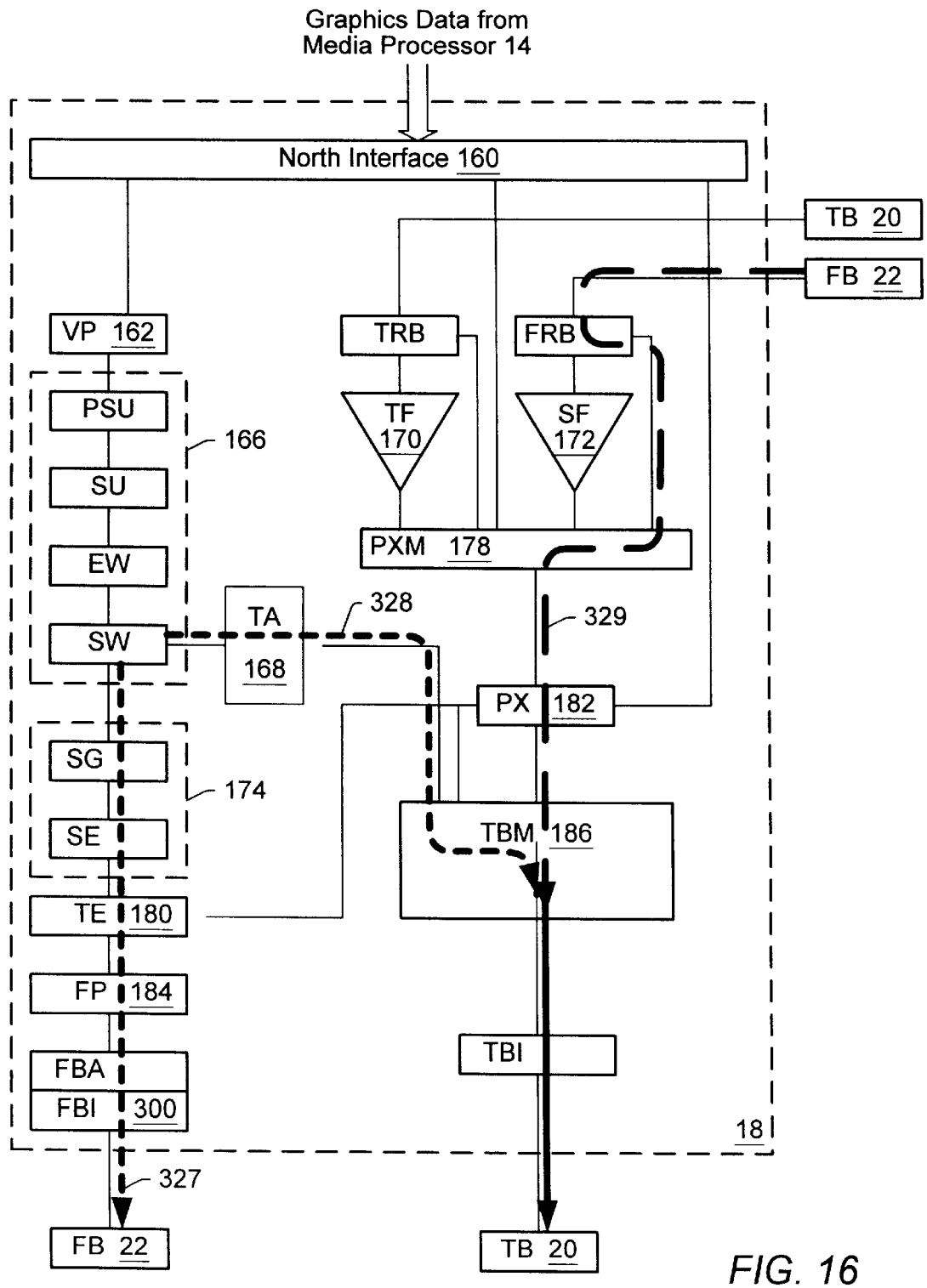
FIG. 16 illustrates the flow of source addresses, destination addresses and data in one embodiment of a copy operation from frame buffer 22 to texture buffer 20.

Turning now to FIG. 16, one embodiment of a copy operation from the frame buffer 22 to the texture buffer 20 is shown. In this example, the span walker SW generates a stream of source addresses and a stream of destination addresses. The source addresses point to locations or blocks in frame buffer 22. The destination addresses point to locations or blocks in texture buffer 20. Three streams are shown in FIG. 16, namely, a source address stream 327, a destination address stream 328, and a data stream 329. The span walker SW may generate source addresses at, e.g., 40–60 clocks ahead of the corresponding destination addresses, to allow enough prefetching to cover the read latency between frame buffer 22 and texture buffer 20.

In some embodiments, the span walker SW uses a 2-D read loop counter, a 2-D write loop counter, a delay counter, a 2-D source address counter and a 2-D destination address counter to control the copy operation. The 2-D source address counter may comprise an x inner loop counter and a y outer loop counter, and may be loaded with an initial frame buffer source address corresponding to frame buffer coordinates $(x_{init}, y_{init})$. The source address stream 327 comprises the (x,y) outputs of the 2-D source address counter. The source address stream gets sent through sample generator SG, sample evaluator SE, texture environment TE, fragment processor FP and frame buffer address unit FBA to frame buffer interface 300.

Associated with each source address (x,y), the span walker SW may issue a normal read command RD_NORM or a read clear command RD_CLR. Thus, the source address stream 327 may include commands as well as source addresses. The read clear command indicates that the source block to be read from frame buffer 20 is to be cleared after the read operation. The normal read command indicates that the source block is to be read without clearing.

A source address (x,y) may specify a pixel or group of pixels (e.g. a 2×2 square of pixels). In this case, each read command may include pixel enable bits. The pixel enable bits specify which of the four pixels in the group are to be read from the frame buffer 22. Other embodiments are contemplated where the number of pixels in a group takes values other than four.

Frame buffer interface 300 responds to a source address (x,y) and corresponding read command (i.e. normal read or read clear command) by invoking the transfer of the selected data from the frame buffer 22 to the frame buffer read buffer FRB. The frame buffer read buffer FRB emits from one to four pixels (or samples or data items) for each read command as specified by the 2×2 pixel enables.

The pixel data is forwarded from the frame buffer read buffer FRB to the pixel transfer MUX 178. The pixel transfer MUX 178 feeds the pixel transfer unit 182. The pixel transfer unit 182 may convert the pixel data to write rp_wr_tif format and send the reformatted data to the texture buffer multiplexor TBM 186. The texture buffer multiplexor 186 is the juncture point where the frame buffer data (i.e. the reformatted data) is matched up with destination addresses from the span walker. The matched data and destination addresses are sent down to texture buffer interface TBI. Texture buffer interface TBI uses the destination addresses to store the corresponding data items into texture buffer 20.

The 2-D destination address counter may comprise a u inner loop counter and a v outer loop counter, and may be loaded with the initial texture buffer destination address ($u_{init}$,$v_{init}$). The destination address stream 328 comprises the outputs (u,v) of the 2-D destination address counter. The span walker SW sends the destination address stream 328 through the texture address unit TA 168 to the texture buffer multiplexor 186.

With each destination address, the span walker SW issues a write command. Thus, the destination address stream 328 may include destination addresses paired together with write commands. The destination address stream 328 combines with data stream 329 at the aforementioned juncture point occurring in the texture buffer multiplexor TBM 186.

Frame Buffer to Frame Buffer Copy Operation

Figure 17:
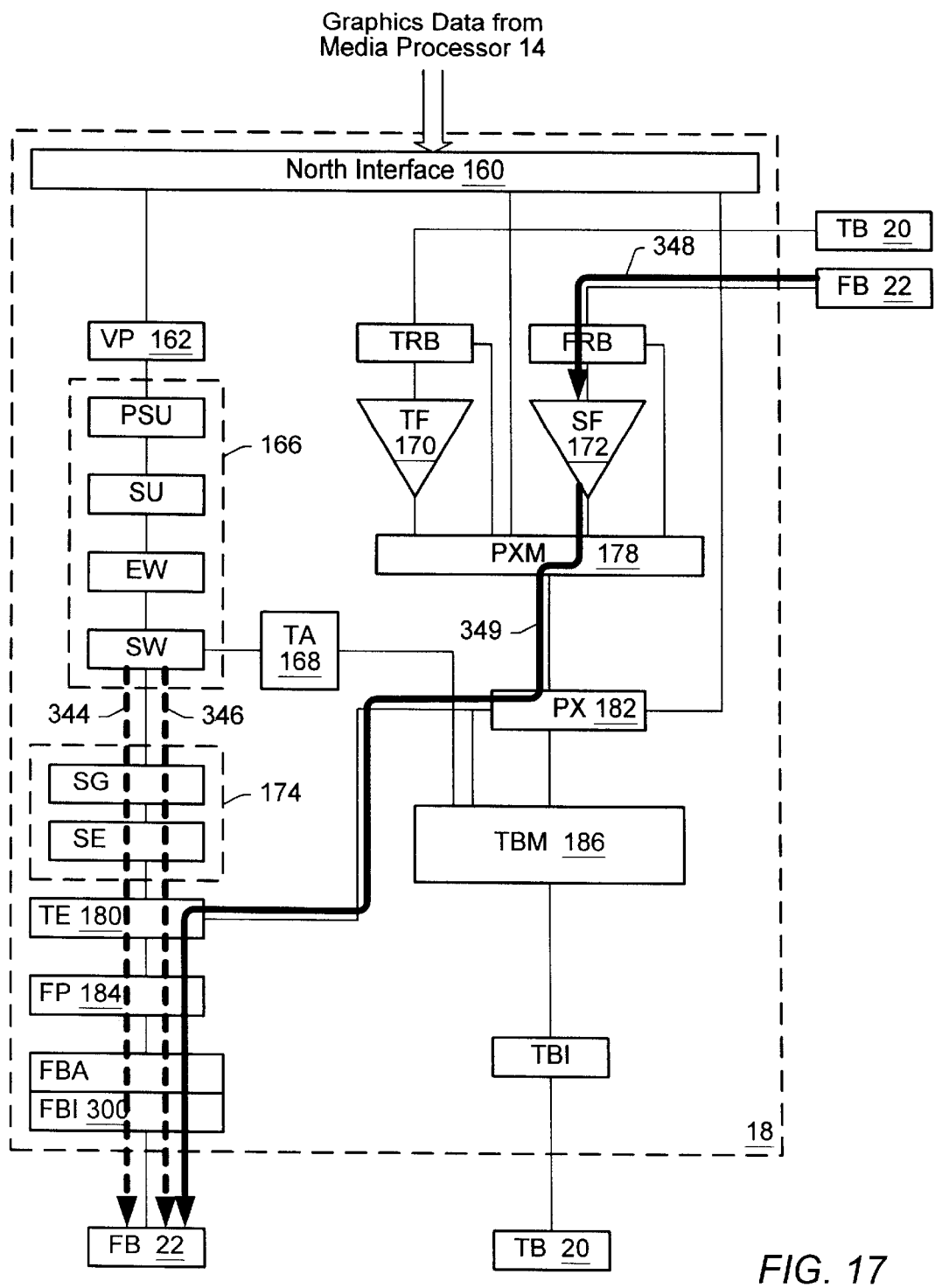
FIG. 17 illustrates the flow of source addresses, destination addresses and data in one embodiment of a copy operation from one portion of frame buffer 22 to another portion of frame buffer 22, where the copy operation sends data through the sample filter 172.

Turning now to FIG. 17, one embodiment of a copy operation where the frame buffer serves as both the data source and the data destination is illustrated. Again, the span walker SW generates a source address stream 344 and a destination address stream 346. The source address stream comprises source addresses (X,Y) which point to bins or groups of bins (e.g. a 2×2 tile of bins) in a sample storage area of the frame buffer 22. The destination address stream comprises destination addresses which point to locations in a pixel storage area of frame buffer 22. Each source address may be paired with a read command, e.g., a normal read command or a read clear command. As above, the read clear command indicates that the source block in the frame buffer 22 is to be cleared after sourcing the desired read operation.

In response to the read commands and the corresponding source addresses, frame buffer interface 300 may invoke a transfer of the requested bin(s) from the sample storage area of frame buffer 22 to frame buffer read buffer FRB. The stream of requested bins is represented by data flow 348. The frame buffer read buffer FRB may forward the requested data 348 to sample filter 172. The sample filter 172 may operate on the samples in the requested bin(s) to generate pixels. The resulting stream of pixels 349 may be sent through pixel transfer multiplexor 178, pixel transfer unit 182, texture environment 180, fragment processor 184 and frame buffer address unit FBA to frame buffer interface 300. Frame buffer interface 300 uses the destination addresses of the destination address stream 346 to store the pixel stream 349 into the pixel storage area of frame buffer 22.

Dual Interpretation of Dirty Tags

In one set of embodiments, the dirty tags stored in the dirty tag bit array may have different interpretations depending on the mode in which they are used. In a normal writeback mode, the bits in a dirty tag may indicate which of the data items in a corresponding level one cache block have been modified by one or more write operations. When the block cleanser processes the dirty tag, the indicated data items may get written back to level two cache memory by the block cleansing process described above.

In a read clear mode, the bits in the dirty tag may indicate which of the data items in the corresponding level one cache block were retrieved (i.e. read out of the frame buffer 22). When the block cleanser processes the dirty tag, the indicated data items may experience a clear operation: the block cleansing process requests a partial block write back of a reserved color fill block (instead of the level one cache block) to the level two cache using the dirty tag bits. For example, if the bits of the dirty tag indicate that the first and third data items in a level one cache block were retrieved in one or more read operations, the first and third data items in the color fill block are transferred to a target block in the level two cache.

Status information unit 334 may maintain a status word for each allocated block in the level one caches 315. The status word may comprise a mode bit (or several mode bits) in addition to a dirty tag. The mode bit may determine the mode of interpretation for the corresponding dirty tag. The mode bit may have one of two states as described above: a normal writeback state and a read clear state.

The block cleanser may operate similarly in the two modes except that the block address sent to the level one cache for sourcing the partial write back to level two is different in the two cases. In the normal writeback mode, the block address is that of the level one cache block under examination. In the read clear write mode, the block address is that of the color fill block. Thus, the same or very similar hardware, microcode and/or program software may be used in the two cases.

The existence of separate read and write busses between level one and level two, i.e. global write bus 317 and global read bus 318, implies that a write back operation (e.g. in the normal write back mode or the read clear mode) for one block may operate in parallel with a fetch operation from level two to level one for another block.

Normal Copy Operation (Without Parallel Clear)

Figure 18:
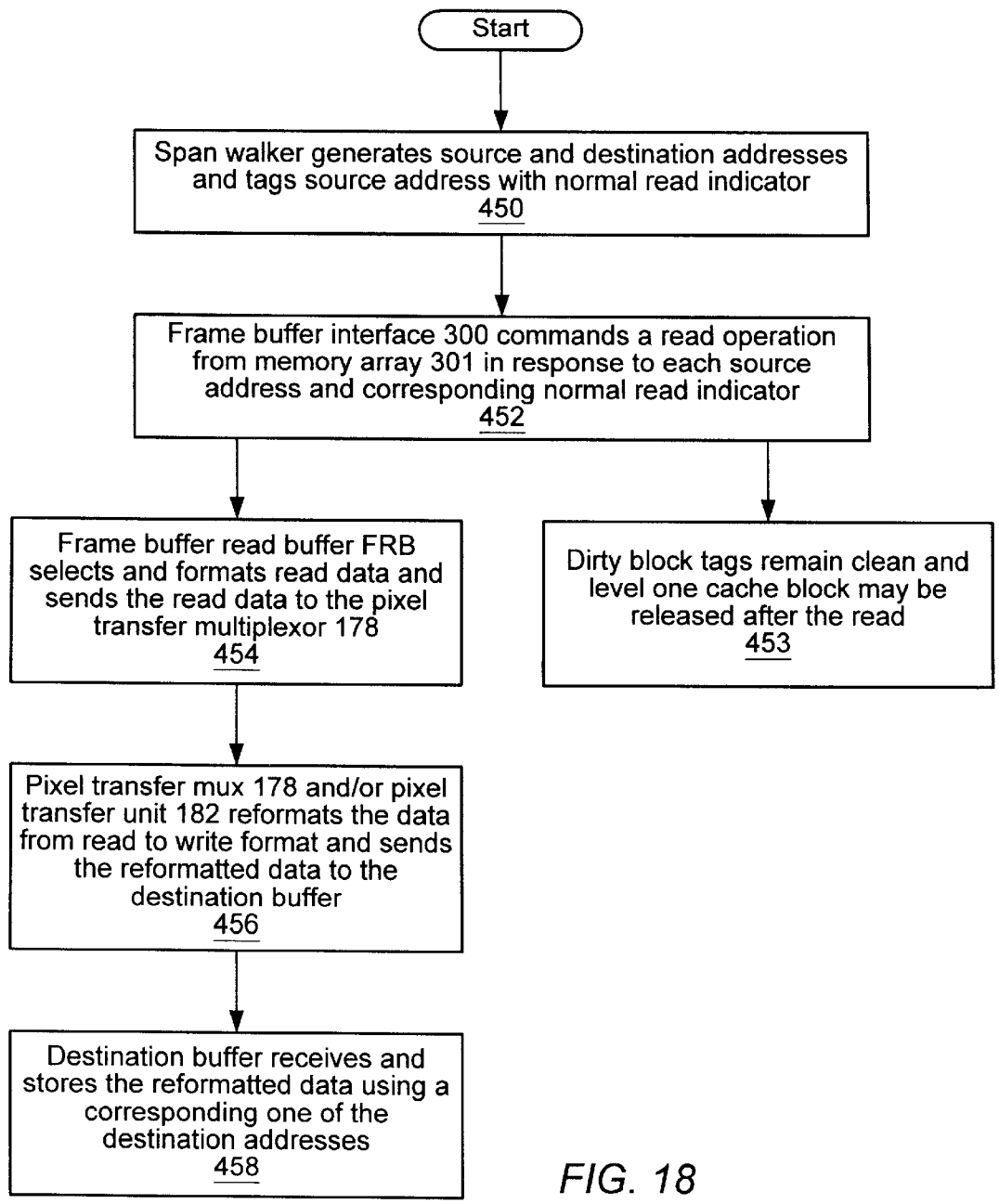
FIG. 18 is a flowchart for one embodiment of a copy operation without a parallel clearing of source data blocks.

FIG. 18 illustrates one embodiment of a copy operation from the frame buffer 22 to a destination buffer (e.g. texture buffer 20 or frame buffer 22) without performing a clear operation in parallel. In step 450, the span walker SW generates a source and a destination address, and tags the source address with a normal read indicator RD_NORM. The source address and associated normal read indicator are sent to frame buffer interface 300.

In step 452, the data request processor 336 invokes an access of source data (e.g. sample data or pixel data) from a level one cache memory 315 of the memory array 301 based on the source address and the corresponding normal read indicator. One or more cache operations such as fetches from DRAM and/or level two cache memory may be performed prior to the access from the level one cache memory. The source data may be sent to frame buffer read buffer FRB.

Data request processor 336 leaves the level one cache block which sourced the read operation in the valid and clean state, i.e., the dirty tag bits associated with the level one cache block are not modified. In step 453, frame buffer interface 300 (e.g. the block cleansing unit 337) may release the level one cache block after the read operation is complete.

In step 454, the frame buffer read buffer FRB formats the source data and sends the source data to the pixel transfer multiplexor 178 either directly or through sample filter 172. The source data may undergo a transformation from samples to pixels in sample filter 172.

In step 456, the pixel transfer multiplexor 178 and/or pixel transfer unit 182 may reformat the data from read to write format and send the reformatted data to the destination buffer.

In step 458, the destination buffer (e.g. a portion of texture buffer 20 or a portion of frame buffer 22) may receive and store the reformatted data using the destination address.

Copy Operation With Parallel Clear

Figure 19:
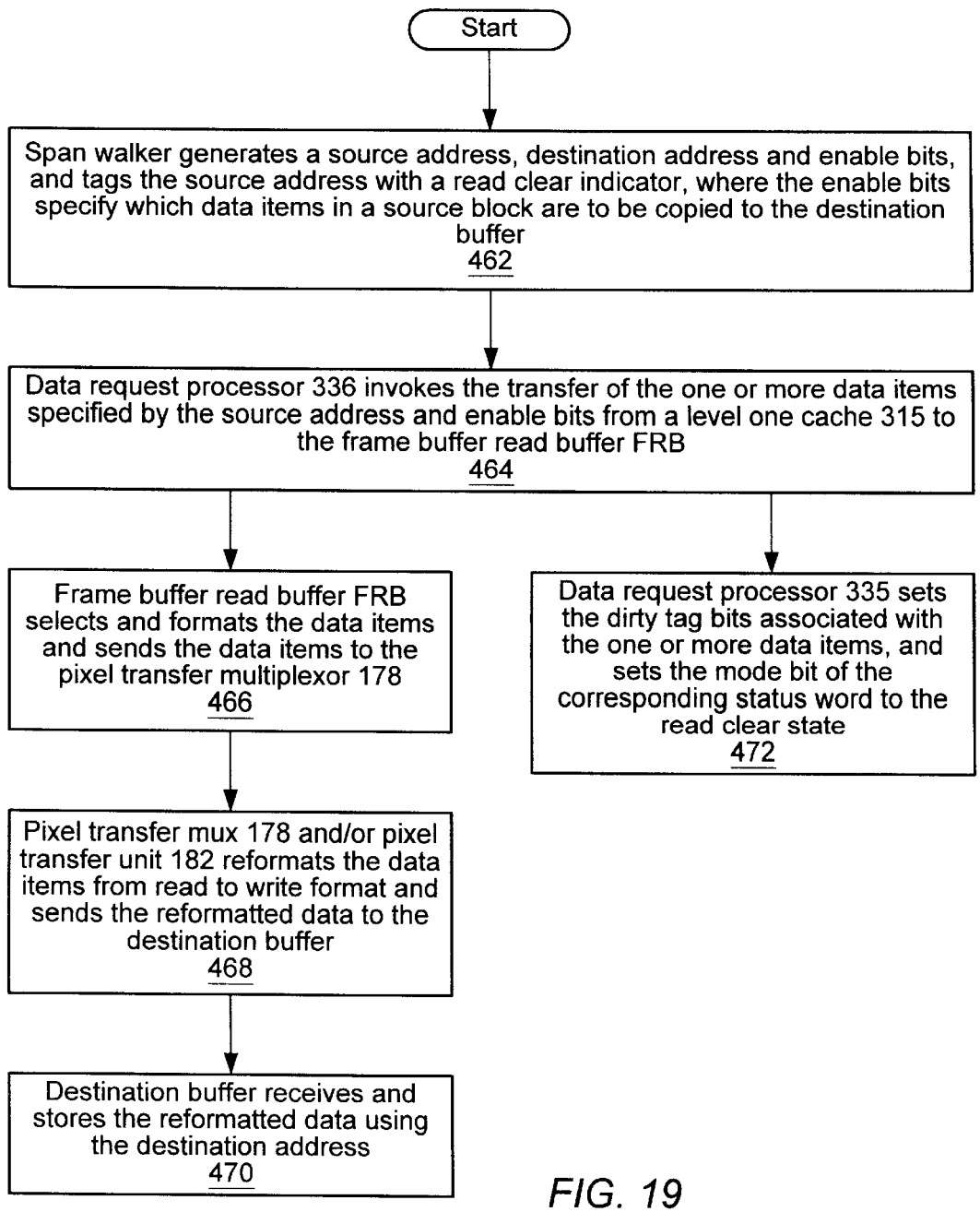
FIGS. 19 and 20 illustrate one embodiment of a copy operation which includes a parallel clearing of source data blocks.
Figure 20:
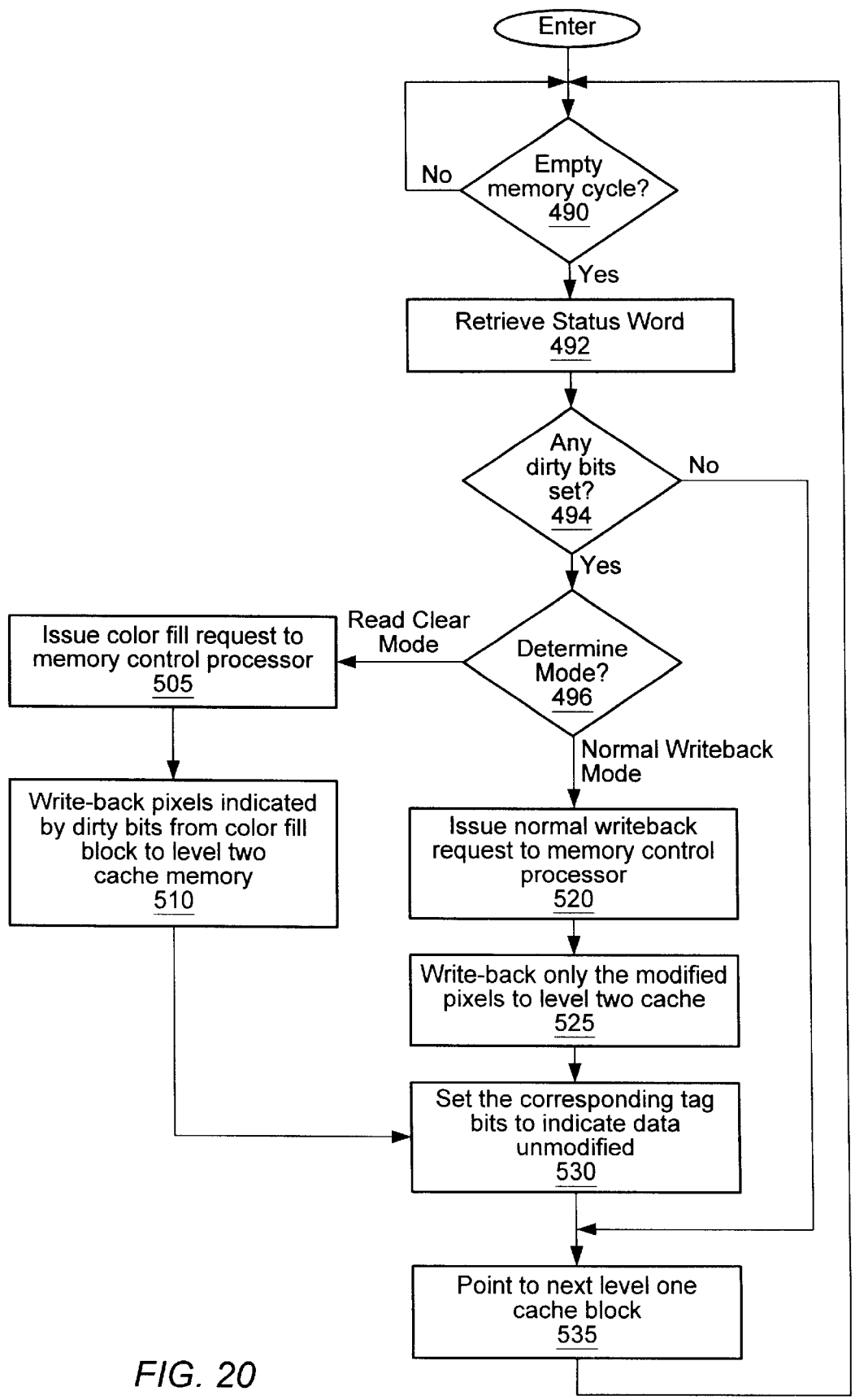

FIGS. 19 and 20 illustrate one embodiment of a data copy operation from the frame buffer to a destination buffer while performing a clear operation in parallel. In step 462 of FIG. 19, the span walker SW generates a source address and a destination address, and tags the source address with a read clear indicator RD_CLR. The source address may correspond to a block of storage to be read from memory array 301. The storage block may comprise a set of data items (e.g. pixels or samples or bins of samples). The span walker may generate enable bits specifying which of the data items of the storage block are to be retrieved from memory array 301. The source address, the associated read clear indicator and enable bits are sent to frame buffer interface 300.

In step 464, the data request processor 336 (operating in response to a data request placed on the data request queue 333 by request preprocessor 330) invokes the transfer (i.e. retrieval) of the one or more data items specified by the source address and enable bits from one of the level one cache memories 315 to the frame buffer read buffer FRB.

If the requested data items do not already reside in a previously allocated level one cache block in one of the level one cache memories 315, memory control processor 335 may allocate a new level one cache block, fetch the data block containing the specified data items from a level two cache 312 and/or DRAM 311, and store the data block in the new level one cache block. The specified data items (or the entire data block containing the specified data items) may then be transferred from the level one cache 315 to frame buffer read buffer FRB.

In response to receiving the read clear indicator corresponding to the source address, data request processor 336 sets the dirty tag bits of the level one cache block which sources the data retrieval. In particular, data request processor 336 sets the dirty tag bits of the one or more data items retrieved (or to be retrieved) from the level one cache bock. In addition, data request processor 336 sets the mode bit of the corresponding status word to the read clear state as indicated in step 472. For example, if the first and fourth data items of the level one cache block are specified for retrieval, the data request processor 336 may set the first and fourth dirty bits of the corresponding dirty tag.

In step 466, the frame buffer read buffer FRB formats the one or more data items and sends them to the pixel transfer multiplexor 178.

In step 468, the pixel transfer multiplexor 178 and/or pixel transfer unit 182 reformats the data items from read to write format and sends the reformatted data to the destination buffer.

In final copy step 470, the destination buffer receives and write copies (i.e. stores) the reformatted data using the destination address supplied by the span walker SW.

The span walker SW may generate a stream of source addresses and a corresponding stream of destination addresses. The discussion above explains how the hardware accelerator 18 and frame buffer 22 operate in response to each source address and its corresponding destination address in a copy operation with parallel clear. As the data request processor 336 commands the retrieval of data from level one cache blocks in response to the "read clear" tagged source addresses, the block cleansing unit 337 may concurrently scan through the level one cache blocks commanding the selective clearing of these blocks.

A block in each level one cache 315 may be allocated and reserved as a color fill block. The contents of the color fill block may be programmed at some time prior to its use (e.g. at system initialization time, at the beginning of a frame or sequence of frames). For example, the pixels (or samples) of the color fill block may be set to some background color such as black or white.

The block cleansing unit 337 may operate as indicated in FIG. 20 to implement a clear operation in parallel with the copy operation described in FIG. 19. In step 490, the block cleansing unit 337 may wait for an empty memory cycle. When an empty cycle becomes available, the block cleansing unit 337 may identify a level one cache block (e.g. the least recently used block) in one of the level one cache memories 315, and retrieve the status word for the level one cache block from status information unit 334 as indicated in step 492.

In step 494, the block cleansing unit 337 determines if any of the dirty bits of the status word have been set. If none of the dirty bits have been set, the block cleansing unit 337 may proceed to step 535. If one or more of the dirty bits have been set, step 496 may be performed.

In step 496, the block cleansing unit 337 may examine the mode bit of the status word to determine how to interpret the dirty bits. If the mode bit indicates the read clear mode, step 505 is performed. If the mode bit indicates the normal writeback mode, step 520 is performed.

In step 505, the block cleansing unit 337 issues a command to the memory control processor 335 requesting a color fill writeback operation. In response to the color fill writeback request, memory control processor 335 controls the writing of the reserved fill color block (instead of the level one cache block) to an appropriate one of the level two caches 312 as indicated in step 510. The memory control processor 335 may use the dirty tag bits associated with the level one cache block to implement a partial block clear, i.e. only those data items of the block whose dirty tag bits are set get cleared by the write back from the color fill block to the level two cache 312.

In step 530, the block cleansing unit 337 marks the dirty tag bits for the level one cache block as clear, i.e. marks the dirty tag bits as clean as opposed to dirty.

If, in the mode determination step 496, the block cleansing unit 337 determines that the mode bit is set to the normal writeback state, step 520 is performed. In step 520, the block cleansing unit 337 issues a command to the memory control processor 335 requesting a normal writeback operation. In response to the normal writeback request, memory control processor 335 controls the write back (or partial writeback) of the level one cache block from the level one cache memory 315 to an appropriate one of the level two caches 312 as indicated in step 525.

After step 525, step 530 is performed. In step 530, the block cleansing unit 337 marks the dirty tag bits for the level one cache block as clear, i.e. marks the dirty tag bits as clean as opposed to dirty.

In step 535, the block cleansing unit may identify another level one cache block (e.g. the next least recently used block) for examination. After step 535, the block cleansing unit 337 may return to step 490.

The block cleansing process of FIG. 20 may operate in parallel with the steps described in FIG. 19. For example, memory control processor 335 may concurrently perform (a) the color fill writeback for a level one cache block and (b) the retrieval of another level one cache block from the same level one cache or a different level one cache. Thus, in some embodiments, the copy with parallel clear operation as discussed above may be performed just as fast as the normal copy operation (i.e. without a parallel clear).

It is noted that there is no requirement for the span walker to generate a continuous stream of normal read requests (i.e. source addresses tagged with normal read indicators) or a continuous stream of read-with-clear requests (i.e. source addresses tagged with read clear indicators). In some embodiments, span walker may generate a stream of reads with both kinds of reads freely intermixed. Thus, frame buffer interface 300 may process a normal read request according to the flowchart of FIG. 18 immediately followed by a read-with-clear request according to the flowchart of FIG. 19, and vice versa.

It is noted that the sample filter may have a filter support region that covers multiple bins in the sample space. Thus, a given bin of samples may be repeatedly accessed in the computation of multiple different pixels. The span walker SW may be configured to determine when a given access of a given bin is the last access (for the current frame) or not. The span walker SW may issue normal reads of the bin up through the next to last access, and a read-clear-mode access in the last access of the bin.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system comprising:
   a memory device, wherein the memory device comprises a level-one cache, a level-two cache and a random access memory (RAM) storage;
   a data request processor configured (a) to receive a read clear request comprising a source address corresponding to a RAM block in the RAM storage, (b) to control a transfer of data from a first level-one cache block in the level-one cache to an output buffer, wherein said data in the first level-one cache block is a copy of identical data in the RAM block of the RAM storage and identical data in the level-two cache, (c) to set one or more bits in a first dirty tag associated with the first level-one cache block, and (d) to set a first mode indicator associated with the first dirty tag to a read clear mode;
   a block cleansing unit configured to examine the first dirty tag associated with the first level-one cache block, and to issue a color fill command to invoke a color fill transfer operation from a color fill block in the level-one cache to the level-two cache in response to detecting that said one or more bits of the first dirty tag are set and that the first mode indicator is set to the read clear mode;
   wherein said data from the first level-one cache block is usable to generate a displayable image.

2. The graphics system of claim 1 further comprising a memory control processor coupled to the block cleansing unit and configured to control transfers between the level-one cache and the level-two cache, and to control the color fill transfer operation from the color fill block to a level-two cache block in the level-two cache in response to the color fill command.

3. The graphics system of claim 2, wherein the memory control processor is configured to (d) control a transfer of a first page from the RAM storage to the level-two cache in response to a determination that a current page of the level-two cache does not contain a copy of said data in the RAM block, wherein the first page contains said copy of said data in the RAM block, wherein (d) is performed prior to (b).

4. The graphics system of claim 3, wherein the memory control processor couples to an array of level-two cache tags, and is configured to examine the array of level-two cache tags to determine if the current page contains said copy of said data in the RAM block.

5. The graphics system of claim 2, wherein the memory control processor is configured to (d) allocate the first level-one cache block in the level-one cache and (e) control a transfer of said data from the level-two cache to the first level-one cache block in response to a determination that no level-one cache block corresponds to the RAM block, wherein (d) and (e) are performed prior to (b).

6. The graphics system of claim 3, wherein the memory control processor couples to an array of level-one cache tags, and is configured to examine the array of level-one cache tags to determine if any level-one cache block corresponds to the RAM block.

7. The graphics system of claim 1 wherein the data request processor is further configured to receive a write request comprising one or more data items and a destination address of a destination block in the RAM storage, to write said one or more data items to a target block in the level one cache corresponding to the destination address, and to set one or more bits in a second dirty tag associated with said target block, and to set a second mode indicator associated with the second dirty tag to a normal writeback mode.

8. The graphics system of claim 7, further comprising a block cleansing unit, wherein the block cleansing unit is configured to examine the second dirty tag, and to issue a write back command to invoke a transfer of at least said one or more data items from the target block to the level two cache in response to detecting that said one or more bits of the second dirty tag are set and that the second mode indicator is set to the normal writeback mode.

9. The graphics system of claim 1 further comprising a sample filter configured to receive said data from the output buffer and to perform a spatial filtering operation using said data to generate a pixel value, wherein the pixel value defines a portion of said displayable image.

10. The graphics system of claim 1, wherein the RAM storage comprise dynamic random access memory (DRAM), wherein the level one cache comprises static random access memory (SRAM).

11. The graphics system of claim 2, wherein the read clear request comprises an enable tag, wherein the data request processor is configured to set the one or more bits of the dirty tag corresponding to bits of the enable tag, wherein the memory control processor is configured to control the transfer of one or more data items of the color fill block corresponding to the one or more dirty tag bits to the level-two cache.

12. The graphics system of claim 1 wherein the block cleansing unit couples to an array of dirty tags including the first dirty tag, wherein the dirty tags corresponding to blocks of the level-one cache, wherein the block cleansing unit is configured to examine the dirty tag array in order to detect that the one or more bits of the first dirty tag are set.

13. The graphics system of claim 1, wherein the memory device is selected from the group consisting of a 3D-RAM memory and 3D-RAM64 memory.

14. A method comprising:
   (a) receiving a read clear request comprising a source address which selects a random access memory (RAM) block in a RAM storage;

(b) transferring data contents of the RAM block to a level-two cache;

(c) transferring said data contents from the level-two cache to a first block of a level-one cache;

(d) transferring said data contents from the first block of the level-one cache to an output buffer, (e) setting one or more bits in a first dirty tag associated with the first block;

(f) setting a first mode indicator associated with the first dirty tag to a read clear mode;

(g) transferring one or more data items from a color fill block in the level-one cache to the level-two cache in response to detecting that said one or more bits of the first dirty tag are set and that the first mode indicator is set to the read clear mode;

wherein said data contents from the first level-one cache block are usable to generate a displayable image.

15. The method of claim 14, wherein (g) comprises transferring one or more data items corresponding to the one or more bits of the first dirty tag which are set from the color fill block to a corresponding block of the level-two cache.

16. The method of claim 14 further comprising:

receiving a write request comprising one or more data values and a destination address of a destination block in the RAM storage;

writing said one or more data values to a target block in the level-one cache corresponding to the destination address;

setting one or more bits in a second dirty tag associated with said target block; and setting a second mode indicator associated with the second dirty tag to a normal writeback mode.

17. The method of claim 16 further comprising transferring at least said one or more data values from the target block to the level-two cache in response to detecting that said one or more bits of the second dirty tag are set and that the second mode indicator is set to the normal writeback mode.

18. The method of claim 14 further comprising:

transferring said data contents to a sample filtering unit, wherein said data contents comprises one or more samples;

perform a filtering operations using said one or more samples to determine a first pixel values, wherein said first pixel values defines a portion of said displayable image.

19. The method of claim 14, wherein the RAM storage comprise dynamic random access memory (DRAM), wherein the level-one cache comprises static random access memory (SRAM).

20. The method of claim 15, wherein the read clear request further comprises an enable tag, the method further comprising:

setting the one or more bits of the dirty tag in agreement with bits of the enable tag;

wherein the one or more bits of the dirty tag which are set define the one or more data items of the color fill block which are transferred to the level-two cache.

21. The method of claim 14, wherein the memory device is selected from the group consisting of a 3D-RAM memory and 3D-RAM64 memory.

22. A memory interface for controlling accesses to a memory device, wherein the memory device includes a level-one cache, a level-two cache and a storage cell array, the memory interface comprising:

a memory control processor configured to control fetch operations from the storage cell array to the level-two cache and from the level-two cache to the level-one cache, and to control write back operations from the level-one cache to the level-two cache;

a data request processor configured to write data items to the level one cache in response to write requests, to control read accesses from the level one cache in response to read requests, wherein the data request processor is further configured to set one or more bits of a first dirty tag to a first state and to set a mode indicator associated with said first dirty tag to a read clear state in response to receiving a read request with an associated read clear indicator;

a block cleansing unit configured to scan through an array of dirty tags including said first dirty tag, to command a color fill transfer operation from a color fill block of the level-one cache to the level-two cache in response to detecting that said one or bits of the first dirty tag are set to the first state and that the mode indicator is set to the read clear state;

wherein the memory control processor is configured to transfer one or more data items from the color fill block to the level-two cache in response to said command, wherein the one or more data items correspond to said one or bits of the first dirty tag which are set to the first state.

23. A memory system comprising:

a write bus coupling a level one cache of a memory device and a level two cache of the memory device;

a read bus coupling the level one cache and the level two cache;

memory control processor configured to control the transfer of source data from source blocks in the level two cache to corresponding allocated blocks in the level one cache;

a block cleansing unit configured to initiate the transfer of data from a color fill block in the level one cache to each of the source blocks in the level two cache in response to detecting that (a) one or more bits of dirty tags associated with the corresponding allocated block is set to a first state and (b) a mode indicator associated with the allocated block is set to a read clear state;

wherein the write bus is configured to convey data from the color fill block in the level one cache to the source blocks in the level two cache in parallel with the read bus conveying said source data from the source blocks in the level two cache to the level one cache.

24. The memory system of claim 23 further comprising a data request processor configured to control the read transfer of the source data from one of the allocated blocks in the level one cache to an output buffer.

25. The memory system of claim 23 further comprising a data request processor configured to set one or more bits of the dirty tag associated with one of the allocated blocks in response receiving a read clear request corresponding to said one allocated block.

26. The memory system of claim 23 further comprising a data request processor configured to set the mode indicator associated with said one of the allocated blocks in response to receiving a read clear request corresponding to said one allocated block.

27. A memory system comprising:

a write bus coupling between a level one cache of a memory device and a level two cache of the memory device;

a read bus coupling between the level one cache and the level two cache;

memory control processor configured to control the transfer of source data from a first source block in the level two cache to a first allocated block in the level one cache;

a block cleansing unit configured to initiate the transfer of data from a color fill block in the level one cache to a second source block in the level two cache in response to detecting that (a) one or more bits of a tag associated with a second allocated block in the level one cache is set to a first state and (b) a mode indicator associated with the second allocated block is set to a read clear state;

wherein the write bus is configured to convey the color fill data from the level one cache to the second source block in the level two cache in parallel with the read bus conveying said source data from the first source block in the level two cache to the level one cache.

28. A method comprising:
(a) receiving read requests addressing a random access memory;
(b) transferring a page of the random access memory to a level two cache;
(c) transferring blocks of the level two cache to a level one cache;
(d) transferring blocks of the level one cache to an output buffer;
(e) transferring data from blocks in the level one cache to the level two cache;
wherein (c) and (e) are performed in parallel;
wherein (e) includes transferring color data from a color fill block in the level one cache to one or more selected blocks in the level two cache.

29. The method of claim 28, wherein the selected one or more blocks are marked as having one or more data items which have sourced one or more read operations.

30. The method of claim 28, wherein the selected one or more blocks are least recently used blocks.

31. A method for reading and clearing a plurality of blocks in a level two cache comprising:

retrieving a plurality of bits, wherein each bit of a first subset of the bits correspond to a block of the plurality of blocks in the level two cache, wherein a second subset of the plurality of bits indicates a mode;

determining if at least one of the bits of the first subset is set;

determining the mode, if said at least one bit is set; and if the mode is read clear, performing, for each set bit of the first subset of the bits:
transferring data of a block corresponding to the set bit to a level one cache;
transferring the data of the block from the level one cache to a data bus; and
transferring data of a color fill block in the level one cache to the block.

32. The method of claim 31,
wherein said transferring data of a block corresponding to the set bit to a level one cache and said transferring data of a color fill block in the level one cache to the block are performed in parallel.

33. The method of claim 31, wherein said performing further includes:
clearing the set bit.

34. The method of claim 31, further comprising:
clearing each bit of the first subset, after said performing.

* * * * *

UNITED STATES PATENT AND TRADEMARK OFFICE
CERTIFICATE OF CORRECTION

PATENT NO. : 6,795,078 B2
DATED : September 21, 2004
INVENTOR(S) : Lavelle et al.

It is certified that error appears in the above-identified patent and that said Letters Patent is hereby corrected as shown below:

Column 26,
Line 45, please delete "wherein the write bus is configured to convey data from" and substitute -- wherein the write bus is configured to convey the data from --.

Signed and Sealed this

Twenty-eighth Day of December, 2004

JON W. DUDAS
*Director of the United States Patent and Trademark Office*